(12) United States Patent
Gordon et al.

(10) Patent No.: US 11,399,559 B2
(45) Date of Patent: Aug. 2, 2022

(54) NUTRITIONAL PRODUCTS HAVING IMPROVED LIPOPHILIC SOLUBILITY AND BIOAVAILABILITY IN AN EASILY MIXABLE FORM

(71) Applicant: ABBOTT LABORATORIES, Abbott Park, IL (US)

(72) Inventors: Gary Gordon, Plain City, OH (US); Mustafa Vurma, Dublin, OH (US)

(73) Assignee: ABBOTT LABORATORIES, Abbott Park, IL (US)

( * ) Notice: Subject to any disclaimer, the term of this patent is extended or adjusted under 35 U.S.C. 154(b) by 122 days.

(21) Appl. No.: 15/748,346

(22) PCT Filed: Jul. 28, 2016

(86) PCT No.: PCT/US2016/044495
§ 371 (c)(1),
(2) Date: Jan. 29, 2018

(87) PCT Pub. No.: WO2017/019872
PCT Pub. Date: Feb. 2, 2017

(65) Prior Publication Data
US 2018/0213834 A1    Aug. 2, 2018

Related U.S. Application Data

(60) Provisional application No. 62/198,512, filed on Jul. 29, 2015.

(51) Int. Cl.
*A23L 33/12* (2016.01)
*A23L 33/155* (2016.01)
(Continued)

(52) U.S. Cl.
CPC .............. *A23L 33/12* (2016.08); *A23L 29/10* (2016.08); *A23L 33/125* (2016.08); *A23L 33/15* (2016.08);
(Continued)

(58) Field of Classification Search
CPC ....... A23L 33/12; A23L 33/125; A23L 33/155
(Continued)

(56) References Cited

U.S. PATENT DOCUMENTS 3,278,310 A    10/1966    Williams et al.
4,262,017 A    4/1981    Kuipers et al.
(Continued)

FOREIGN PATENT DOCUMENTS

CN    1181194 A    5/1998
CN    101888788 A    5/1998
(Continued)

OTHER PUBLICATIONS

Response to Office Action from U.S. Appl. No. 14/915,548 dated Oct. 4, 2018.
(Continued)

*Primary Examiner* — Helen F Heggestad
(74) *Attorney, Agent, or Firm* — Calfee, Halter & Griswold LLP

(57) ABSTRACT

Methods of preparing a nutritional product which contain a lipophilic nutrient are disclosed. The nutritional product is made using a fortifying powder containing the lipophilic nutrient, a monoglyceride and diglyceride ("MDG") oil, a phospholipid, and a carrier. The fortifying powder enhances the digestive absorption of the lipophilic nutrient when the nutritional product is consumed. The fortifying powder simplifies the process of manufacturing the nutritional product, as the fortifying powder can be added at a suitable stage of the process with other powdered ingredients. The forti-
(Continued)

fying powder may be manufactured in bulk and stored for later use, thereby improving manufacturing efficiencies. The fortifying powder and methods of preparing the fortifying powder are also presented.

13 Claims, 7 Drawing Sheets

(51) Int. Cl.
| | |
|---|---|
| A23L 29/10 | (2016.01) |
| A23L 33/15 | (2016.01) |
| A23L 33/19 | (2016.01) |
| A23L 33/16 | (2016.01) |
| A23L 33/125 | (2016.01) |
| A23P 10/40 | (2016.01) |

(52) U.S. Cl.
CPC ............. *A23L 33/155* (2016.08); *A23L 33/16* (2016.08); *A23L 33/19* (2016.08); *A23P 10/40* (2016.08); *A23V 2002/00* (2013.01)

(58) Field of Classification Search
USPC ......... 426/601, 73, 648, 654, 661, 465, 471, 426/426, 519, 520
See application file for complete search history.

(56) References Cited

U.S. PATENT DOCUMENTS

| | | | |
|---|---|---|---|
| 4,519,961 A | 5/1985 | Schumacher et al. | |
| 6,677,327 B1 | 1/2004 | Gottemoller | |
| 7,288,278 B2* | 10/2007 | Mellerup et al. | |
| 2004/0013708 A1 | 1/2004 | Goulson | |
| 2004/0214791 A1 | 10/2004 | Auestad et al. | |
| 2005/0191343 A1 | 9/2005 | Liang | |
| 2007/0098849 A1 | 5/2007 | Barrett-Reis | |
| 2007/0054028 A1* | 8/2007 | Perlman et al. | |
| 2011/0014288 A1 | 1/2011 | Hansen | |
| 2012/0282368 A1* | 11/2012 | Perlman et al. | |
| 2014/0323574 A1 | 10/2014 | Yao et al. | |
| 2015/0031628 A1* | 1/2015 | Spilburg | |
| 2015/0136638 A1* | 5/2015 | Eymard et al. | |
| 2015/0237902 A1 | 8/2015 | Rosado Loria et al. | |
| 2015/0245644 A1 | 9/2015 | Rosado Loria et al. | |
| 2016/0015068 A1 | 1/2016 | Ao et al. | |
| 2016/0249665 A1 | 9/2016 | Schulman et al. | |

FOREIGN PATENT DOCUMENTS

| | | |
|---|---|---|
| CN | 1440240 A | 9/2003 |
| CN | 101198261 B | 5/2013 |
| CN | 103200830 A | 7/2013 |
| EP | 1062873 A1 | 12/2000 |
| WO | 2004026294 A1 | 4/2004 |
| WO | 2006114791 A1 | 11/2006 |
| WO | 2010114627 A1 | 10/2010 |
| WO | 2011008097 A1 | 1/2011 |
| WO | 2013003529 A1 | 1/2013 |
| WO | 2013068879 A2 | 5/2013 |
| WO | 2015031637 | 3/2015 |
| WO | 2015031657 | 3/2015 |
| WO | 2015069974 A1 | 5/2015 |
| WO | 2015084532 A1 | 6/2015 |
| WO | 2016010664 A1 | 1/2016 |
| WO | 2016097220 A1 | 6/2016 |
| WO | 2016097221 A1 | 6/2016 |
| WO | 2016101891 A1 | 6/2016 |

OTHER PUBLICATIONS

USPTO Interview Summary from Office Action from U.S. Appl. No. 14/915,548 dated Oct. 9, 2018.
Response to Office Action from U.S. Appl. No. 14/915,552 dated Oct. 4, 2018.
Notification to Grant Patent Right for Invention from Chinese Application No. 201480053945.8 dated Oct. 19, 2018.
Communication Under Rule 71(3) EPC from European Application No. 14762193.2 dated Oct. 8, 2018.
Office Action with Search Report from Taiwan Patent Application No. 103129763 dated Oct. 11, 2018 (Search Report in English).
Mang, Ke-Qiang, "Agricultural and Biological Engineering," Chemical Industry Press, Mar. 31, 2004: 282.
Response to Office Action from U.S. Appl. No. 14/915,548 dated Apr. 16, 2019.
Office Action from U.S. Appl. No. 14/915,548 dated May 16, 2019.
Response to Office Action from U.S. Appl. No. 14/915,552 dated Apr. 16, 2019.
Office Action from Canadian Application No. 2,993,228 dated Feb. 8, 2019.
Further Examination Report Postponed Acceptance from New Zealand Application No. 738834 dated Apr. 18, 2019.
International Search Report and Written Opinion from PCT Application No. PCT/US2016/044495 dated Oct. 10, 2016.
International Search Report and Written Opinion from PCT Application No. PCT/US2014/053197 dated Oct. 28, 2014.
International Preliminary Report on Patentability from PCT Application No. PCT/US2014/053197 dated Mar. 1, 2016.
International Search Report and Written Opinion from PCT Application No. PCT/US2014/053230 dated Oct. 28, 2014.
Office Action from Canadian Application No. 2,922,242 dated Apr. 10, 2017.
Office Action from Canadian Application No. 2,922,242 dated Jan. 30, 2018.
Office Action from Canadian Application No. 2,922,351 dated Apr. 10, 2017.
Office Action from Canadian Application No. 2,922,351 dated Jan. 30, 2018.
First Office Action from Chinese Application No. 201480053008.2 dated Feb. 27, 2017.
Second Office Action from Chinese Application No. 201480053008.2 dated Dec. 5, 2017.
First Office Action from Chinese Application No. 201480053945.8 dated Mar. 14, 2017.
Second Office Action from Chinese Application No. 201480053945.8 dated Nov. 27, 2017.
Office Action from Israeli Patent Application No. 244100 dated Nov. 13, 2017.
International Preliminary Reporton Patentability from PCT Application No. PCT/US2014/053230 dated Mar. 1, 2016.
Communication Pursuant to Article 94(3) EPC from European Application No. 14761548.8 dated Oct. 31, 2017.
Communication Pursuant to Article 94(3) EPC from European Application No. 14762193.2 dated Oct. 30, 2017.
Search Report and Written Opinion from Singapore Application No. 11201601278V dated Jan. 10, 2017.
Written Opinion from Singapore Application No. 11201601278V dated Sep. 22, 2017.
Search Report and Written Opinion from Singapore Application No. 11201601277X dated Jan. 10, 2017.
Written Opinion from Singapore Application No. 11201601277X dated Sep. 22, 2017.
Third Party Observation from PCT Application No. PCT/US2016/044495 dated Nov. 28, 2017.
Encyclopedia of Dairy Sciences, Second Edition, Imitation Dairy Products, p. 914 (3 pages), copyright 2011.
Mensi et al. "Interactions of [beta]-Lactoglobulin Variants A and B with Vitamin A. Competitive Binding of Retinoids and Carotenoids," Journal of Agricultural and Food Chemistry, vol. 61, No. 17, May 1, 2013 pp. 4114-4119 XP055145838.
Pomeranz "Functional Properties of Food Components", Grain Marketing Research Laboratory, United States Department of Agriculture, pp. 374-375 1985.
Spernath et al., "Food-Grade Microemulsions Based on Nonionic Emulsifiers: Media to Enhance Lycopene Solubilization," Journal of

(56) References Cited

OTHER PUBLICATIONS

Agricultural and Food Chemistry, American Chemical Society, US, vol. 50, Jan. 1, 2002 pp. 6917-6922 XP002303729.
Office Action from U.S. Appl. No. 14/915,548 dated Jul. 6, 2018.
Third Office Action from CN 201480053008.2 dated Jun. 11, 2018.
Third Office Action from Chinese Application No. 201480053945.8 dated May 15, 2018.
Communication Pursuant to Article 94(3) EPC from European Application No. 14761548.8 dated Jul. 6, 2018.
Communication Pursuant to Article 94(3) EPC from European Application No. 14762193.2 dated Jul. 6, 2018.
Office Action from Israeli Application No. 244064 dated May 7, 2018.
First Examination Report from New Zealand Application No. 738834 dated Jun. 20, 2018.
Keqiang et al., Agricultural Bioengineering, Chemical Industry Press, p. 282 "IV β-lactoglobulin of sheep and expression construction thereof" Mar. 31, 2004.
Office Action from U.S. Appl. No. 14/915,552 dated Jul. 5, 2018.
Notice of Eligibility for Grant from Singapore Application No. 11201601278V dated Jul. 3, 2018.
Notice of Eligibility for Grant from Singapore Application No. 11201601277X dated Jul. 3, 2018.
Final Office Action from U.S. Appl. No. 14/915,548 dated Jan. 22, 2019.
Final Office Action from U.S. Appl. No. 14/915,552 dated Jan. 22, 2019.
Decision on Rejection from CN 201480053008.2 dated Nov. 1, 2018.
Communication pursuant to Article 94(3) EPC from European Application No. 14761548.8 dated Oct. 18, 2018.
Examination Report from New Zealand Application No. 738834 dated Jan. 17, 2019.
Response to Office Action from U.S. Appl. No. 14/915,548 dated Jul. 29, 2019.
Office Action from U.S. Appl. No. 14/915,552 dated Jun. 11, 2019.
Response to Office Action from U.S. Appl. No. 14/915,552 dated Aug. 8, 2019.
Office Action from U.S. Appl. No. 14/915,548 dated Oct. 24, 2019.
Office Action from U.S. Appl. No. 14/915,552 dated Nov. 1, 2019.
Office Action from Canadian Application No. 2,993,228 dated Oct. 8, 2019.
Office Action from Mexican Patent Application No. MX/a/2016/002572 dated Sep. 25, 2019.
Office Action from Mexican Patent Application No. MX/a/2016/002573 dated Oct. 22, 2019.
Office Action with Search Report from Taiwan Patent Application No. 103129763 dated Apr. 23, 2019.
Pre-Brief Conference Request from U.S. Appl. No. 14/915,552 dated Nov. 9, 2020.
English Translation of Notice of Reexamination from CN 201480053008.2 dated Sep. 23, 2020.
Office Action from Israeli Application No. 256788 dated Sep. 9, 2020.
Patent Examination Report 1 from New Zealand Application No. 716779 dated Oct. 12, 2020.
Response to Office Action from U.S. Appl. No. 14/915,548 dated Jan. 23, 2020.
Office Action from U.S. Appl. No. 14/915,548 dated Feb. 13, 2020.
Response to Office Action from U.S. Appl. No. 14/915,548 dated Jun. 12, 2020.
Office Action from U.S. Appl. No. 14/915,548 dated Aug. 21, 2020.
Response to Office Action from U.S. Appl. No. 14/915,552 dated Jan. 30, 2020.
Office Action from U.S. Appl. No. 14/915,552 dated Apr. 29, 2020.
Response to Office Action from U.S. Appl. No. 14/915,552 dated Jul. 28, 2020.
Office Action from U.S. Appl. No. 14/915,552 dated Aug. 10, 2020.
Office Action from Chinese Application No. 201680043239.4 dated Jun. 11, 2020.
Notice of Opposition from European Application No. 14761548.8 dated Aug. 13, 2020.
Exam Report from Malaysian Application No. PI 2016700637 dated Feb. 7, 2020.
Office Action from Mexican Patent Application No. MX/a/2016/002573 dated Jul. 15, 2020.
Office Action from Vietnamese Office Action No. 1-2016-01077 dated Apr. 9, 2020.
Office Action from Vietnamese Office Action No. 1-2016-01104 dated Mar. 26, 2020.
Response to Office Action from U.S. Appl. No. 14/915,548 dated Nov. 19, 2020.
Office Action from U.S. Appl. No. 14/915,548 dated Feb. 9, 2021.
Appeal Brief Filed in U.S. Appl. No. 14/915,552 dated Jan. 8, 2021.
Examiner's Answer to Appeal Brief from U.S. Appl. No. 14/915,552 dated Mar. 22, 2021.
Office Action from CN 201480053008.2 dated Apr. 1, 2021 with English Translation.
English Translation of Decision on Rejection from Chinese Application No. 201680043239.4 dated Feb. 7, 2021.
Patent Examination Report 1 from New Zealand Application No. 716781 dated Mar. 17, 2021.
Patent Examination Report 2 from from New Zealand Application No. 716779 dated May 6, 2021 (5 pages).

* cited by examiner

US 11,399,559 B2

NUTRITIONAL PRODUCTS HAVING IMPROVED LIPOPHILIC SOLUBILITY AND BIOAVAILABILITY IN AN EASILY MIXABLE FORM

CROSS-REFERENCE TO RELATED APPLICATIONS

This application is the U.S. national phase entry of PCT/US2016/044495, with an international filing date of Jul. 28, 2016, which claims priority to and the benefit of U.S. Provisional Patent Application No. 62/198,512, filed Jul. 29, 2015, the entire content of which is incorporated by reference herein.

FIELD

The present disclosure relates to methods for preparing nutritional products containing fortifying powders containing lipophilic nutrients. The present disclosure also relates to fortifying powders containing lipophilic nutrients and methods of making such fortifying powders. These fortifying powders and the nutritional products containing them improve the bioavailability of the lipophilic nutrient contained in the fortifying powder.

BACKGROUND

Adult, pediatric, and infant manufactured nutritional products may comprise a variety of lipophilic nutrients such as carotenoids, lipid soluble vitamins, lipophilic antioxidants, or combinations thereof. Current nutritional products comprising lipophilic nutrients typically provide limited bioavailability of these nutrients following consumption because lipophilic nutrients are not soluble or stable in aqueous mixtures. As a result, the nutritional products are often over-fortified with lipophilic nutrients to ensure that the desired nutritional benefits from the compounds may be obtained. In some cases, the over-fortification may be from about 2 times to about 10 times the amount of lipophilic nutrients required to achieve the desired benefits.

These high fortification rates may lead to increased production costs and potential complications in formulating the nutritional product without providing additional consumer benefits. Furthermore, the over fortified nutritional products may overwhelm the digestive tract of the user with insoluble lipophilic nutrients, leading to indigestion.

SUMMARY OF THE INVENTION

In some embodiments, the present disclosure is directed to methods for preparing a nutritional product containing a lipophilic nutrient. The method comprises mixing a lipophilic nutrient, a monoglyceride and diglyceride (MDG) oil, and a phospholipid to form a first mixture. The first mixture is mixed with an aqueous liquid comprising a carrier, and the resulting aqueous mixture is dried to form a fortifying powder. This fortifying powder comprises MDG oil at a concentration of about 6 wt % to about 50 wt % and the phospholipid at a concentration of about 1 wt % to about 12 wt %. The fortifying powder is mixed with a base nutritional composition to form a nutritional product. In some embodiments, the base nutritional composition or resulting nutritional product may be in the form of powders, solutions, emulsions, suspensions, or gels.

In some embodiments, the present disclosure is directed to methods for preparing a fortifying powder containing a lipophilic nutrient. The method comprises mixing a lipophilic nutrient, MDG oil, and a phospholipid to form a first mixture. The first mixture is mixed with an aqueous liquid comprising a carrier, and the resulting aqueous mixture is dried to form a fortifying powder. This fortifying powder comprises MDG oil at a concentration of about 6 wt % to about 50 wt % and the phospholipid at a concentration of about 1 wt % to about 12 wt %. In some embodiments, the fortifying powder is further mixed with a base nutritional composition to form a nutritional product.

In some embodiments, the present disclosure is directed to a fortifying powder. The fortifying powder comprises a lipophilic nutrient, an MDG oil, a phospholipid, and a carrier. The fortifying powder contains the MDG oil at a concentration of about 6 wt % to about 50 wt % and the phospholipid at a concentration of about 1 wt % to about 12 wt %. In some embodiments, the fortifying powder is mixed with a base nutritional composition to form a nutritional product.

DETAILED DESCRIPTION

Figure 1:
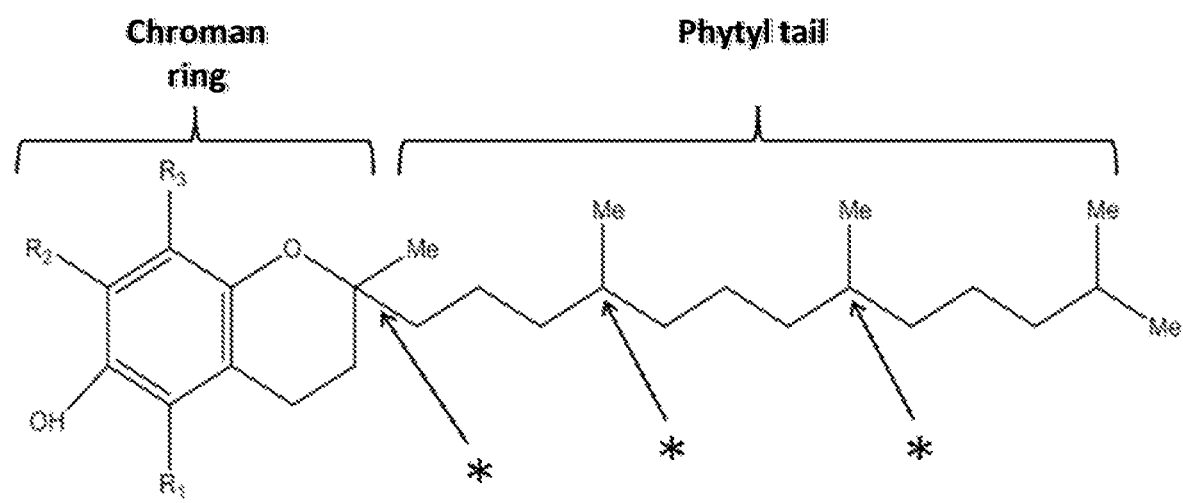
FIG. 1 is the chemical structure of the tocopherol family.

While embodiments encompassing the general inventive concepts may take diverse forms, various embodiments will be described herein, with the understanding that the present disclosure is to be considered merely exemplary, and the general inventive concepts are not intended to be limited to the disclosed embodiments.

The present invention relates to nutritional products for the delivery of nutrients, including lipophilic nutrients, in a more bioavailable form. A fortifying powder comprising a lipophilic nutrient, an oil comprising monoglycerides and diglycerides (hereafter, an "MDG oil"), a phospholipid, and a carrier is prepared and dried. This fortifying powder is used to fortify nutritional products, such as nutritional products, that provide improved bioavailability of the lipophilic nutrient in the fortifying powder.

The fortifying powder enables the nutritional composition to deliver lipophilic nutrients without over-fortification, which decreases production costs, limits composition complications, and results in a more desirable product. The nutritional composition may be ingested by an infant, toddler, child, or adult, thereby providing the nutrients needed for proper development, growth, or nutritional requirements.

In some embodiments, the present disclosure is directed to methods for preparing a nutritional product containing a lipophilic nutrient. The method comprises mixing a lipophilic nutrient, a monoglyceride and diglyceride (MDG) oil, and a phospholipid to form a first mixture. The first mixture is mixed with an aqueous liquid comprising a carrier, and the resulting aqueous mixture is dried to form a fortifying powder. This fortifying powder comprises MDG oil at a concentration of about 6 wt % to about 50 wt % and the phospholipid at a concentration of about 1 wt % to about 12 wt %. The fortifying powder is mixed with a base nutritional composition to form a nutritional product. In some embodiments, the base nutritional composition or resulting nutritional product may be in the form of powders, solutions, emulsions, suspensions, or gels.

In some embodiments, the present disclosure is directed to methods for preparing a fortifying powder containing a lipophilic nutrient. The method comprises mixing a lipophilic nutrient, an MDG oil, and a phospholipid to form a first mixture. The first mixture is mixed with an aqueous liquid comprising a carrier, and the resulting aqueous mixture is dried to form a fortifying powder. This fortifying powder comprises MDG oil at a concentration of about 6 wt % to about 50 wt % and the phospholipid at a concentration of about 1 wt % to about 12 wt %. In some embodiments, the fortifying powder is further mixed with a base nutritional composition to form a nutritional product.

In some embodiments, the present disclosure is directed to a fortifying powder. The fortifying powder comprises a lipophilic nutrient, an MDG oil, a phospholipid, and a carrier. The fortifying powder contains the MDG oil at a concentration of about 6 wt % to about 50 wt % and the phospholipid at a concentration of about 1 wt % to about 12 wt %. In some embodiments, the fortifying powder is mixed with a base nutritional composition to form a nutritional product.

For the purpose of the present disclosure, the following terms are defined:

The term "base nutritional composition" as used herein, unless otherwise specified, refers to nutritional compositions before a fortifying powder is added. Base nutritional compositions comprise at least one of protein, carbohydrate, and fat, and are suitable for enteral administration to a subject. Base nutritional compositions may further comprise vitamins, minerals, and other ingredients, and represent sole, primary, or supplemental sources of nutrition.

The terms "bioavailable" or "bioavailability" as used herein, unless otherwise specified, refer to the amount of a nutrient made available to target tissues in a subject through the systemic circulation in the subject's body. In this context, the terms "bioavailable" or "bioavailability" may specifically refer to the ability of a lipophilic nutrient, such as lutein or Vitamin D, to be absorbed from the gastrointestinal tract into lymph which will then enter into the bloodstream of an individual such that the substance can be absorbed into organs and tissues in the body. As the degree of bioavailability of a nutrient increases, the nutrient becomes more likely to enter into and remain in the bloodstream where it is absorbed and used by the body. As the degree of bioavailability of a nutrient decreases, the nutrient becomes less likely to be absorbed into lymph from the gastrointestinal tract and instead is excreted from the body before entering the bloodstream.

The term "dry blended" as used herein, unless otherwise specified, refers to the mixing of dry or semi-dry components or ingredients to form a powder, or to the addition of a dry, powdered, or granulated component or ingredient to an existing powder, to form a powdered composition.

The terms "enteral administration" or "enterally administering" as used herein refer to providing a composition that is ingested by the subject through the gastrointestinal tract, e.g., orally or through a feeding tube into the stomach. This is in contrast to parenteral administration, which occurs through means other than the gastrointestinal tract, e.g., intravenously.

The terms "fat," "lipid," and "oil" as used herein, unless otherwise specified, are used interchangeably to refer to lipid materials derived or processed from plants or animals. These terms also include synthetic lipid materials so long as such synthetic materials are suitable for administration to subjects as defined herein.

The term "fatty acids" as used herein refer generally to carboxylic acids with long lipophilic chains comprising carbon and hydrogen atoms. Specific fatty acids can be identified by counting the number of carbon atoms and determining other chemical properties, such as the presence and location of double bonds between the carbon atoms, any branching of carbon atoms off the main lipophilic chain, and the presence of other atomic species in the chain. Fatty acids may be described as "saturated" (no double bonds between the carbon atoms in the carbon chain), "monounsaturated" (one double bond between the carbon atoms in the carbon chain), or "polyunsaturated" (more than one double bond between the carbon atoms in the carbon chain). For the purpose of this disclosure, "free fatty acids" refers to unbound fatty acid molecules, while "fatty acid groups" refers to fatty acid moieties bonded to other molecules. For the purpose of this disclosure, fatty acid groups are preferably bonded to glycerol molecules to form glycerides. For the purpose of this disclosure, "fatty acids" refer to both free fatty acids and fatty acid groups in a composition, unless otherwise specified.

The term "fortifying powder" as used herein, unless otherwise specified, refers to an additive in powder form that contains one or more lipophilic nutrients. A fortifying powder is mixed with a composition to fortify the composition with the lipophilic nutrients. The composition to which the fortifying powder is added may be a nutritional composition, or it may be another product (e.g., coffee, tea, smoothie, or foodstuff) consumed enterally by a subject. Specifically, for the purpose of this disclosure, a fortifying powder comprises one or more lipophilic nutrients, an MDG oil, a phospholipid, and a carrier.

The term "glycerides" as used herein refer generally to lipophilic nutrients comprising a glycerol molecule bonded to fatty acid groups. Monoglycerides are glycerol molecules bonded to a single fatty acid group; diglycerides are glycerol molecules bonded to two fatty acid groups; and triglycerides are glycerol molecules bonded to three fatty acid groups. Fats and oils comprise glycerides, and typical fats and oils from animal, fish, algae, vegetable, or seed sources are comprised primarily of triglycerides.

The term "infant," as used herein, unless otherwise specified, refers to a human about 36 months of age or younger. The term "toddler," as used herein, unless otherwise specified, refers to a human about 12 months of age to about 3 years of age. The term "child," as used herein, unless otherwise specified, refers to a human about 3 years of age to about 18 years of age. The term "adolescent," as used herein, unless otherwise specified, refers to a human about 10 years of age to about 18 years of age. The term "adult," as used herein, unless otherwise specified, refers to a human about 18 years of age or older. The term "older adult," as used herein, unless otherwise specified, refers to a human about 50 years of age or older.

The term "lipophilic nutrient" as used herein refers to components that have greater solubility in organic solvents such as ethanol, methanol, ethyl ether, acetone, chloroform, benzene, or lipids than they have in water. Vitamin A, Vitamin E, Vitamin D, lutein, zeaxanthin, and lycopene are examples of lipophilic nutrients. For the purpose of this disclosure, the term "lipophilic nutrient" may be applied to other lipophilic nutrients, including but not limited to pharmaceutical compounds.

The terms "monoglyceride and diglyceride oil" or "MDG oil" as used herein refer to an oil comprising monoglycerides and diglycerides, and which contains from 0 wt % to about 20 wt % triglycerides, based on the weight of the MDG oil. The MDG oil comprises fatty acids which may be saturated or unsaturated. Based on the percent of total fatty acids, from about 60% to about 98% of the fatty acids in the MDG oil are unsaturated, and less than about 10% of the fatty acids in the MDG oil are polyunsaturated. At least about 70% of the fatty acids in the MDG oil contain from 14 to 24 carbon atoms.

The term "nutritional composition" as used herein, unless otherwise specified, refers to nutritional powders, solids, semi-solids, liquids, and semi-liquids that comprise at least one of protein, carbohydrate, and fat, and are suitable for enteral administration to a subject. Nutritional compositions may further comprise vitamins, minerals, and other ingredients, and represent sole, primary, or supplemental sources of nutrition.

The term "nutritional product" as used herein refers to nutritional compositions in powder form. Nutritional products comprise at least one of protein, carbohydrate, and fat, and are suitable for enteral administration to a subject. Nutritional products may further comprise vitamins, minerals, and other ingredients, and represent sole, primary, or supplemental sources of nutrition. Nutritional products may further comprise fortifying powders.

The terms "reconstitute," or "reconstitution" as used herein refer to powders that are mixed with water or another aqueous liquid to create a liquid composition or liquid nutritional composition.

The term "powder" as used herein describes a physical form of a composition, or portion thereof, that is a finely divided particulate solid that is flowable or scoopable.

The term "subject" as used herein refers to a mammal, including but not limited to a human, a domesticated farm animal (e.g., cow, horse, or pig), or a pet (e.g., dog or cat), who ingests the composition.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein may be used in practice or testing of the nutritional composition. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of" the embodiments or elements presented herein, whether explicitly set forth or not. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use.

All percentages, parts, and ratios as used herein are by weight of the total product, unless specified otherwise. All such weights as they pertain to listed ingredients are based on the active ingredients and, therefore, do not include solvents or by-products that may be included in commercially available materials, unless specified otherwise.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, and 10) contained within the range.

The various embodiments of the compositions of the present disclosure may include trace amounts of any optional or selected essential ingredient or feature described herein, provided that the remaining formulation still contains all of the required ingredients or features as described herein. In this context, and unless otherwise specified, the term "trace amount" means that the selected formulation contains no more than 2 wt % of the optional ingredient, typically less than 1 wt %, and also includes zero percent, of such optional or selected essential ingredient, by weight of the composition.

The various embodiments of the compositions of the present disclosure may also be substantially free of any optional ingredient or feature described herein, provided that the remaining composition still contains all of the required ingredients or features as described herein. In this context, and unless otherwise specified, the term "substantially free" means that the selected composition contains less than a functional amount of the optional ingredient, typically less than about 1 wt %, including less than about 0.5 wt %, including less than about 0.1 wt %, and also including zero percent, of such optional ingredient, by weight of the composition.

The compositions may comprise, consist of, or consist essentially of the required elements of the products as described herein, as well as any additional or optional element described herein or otherwise useful in product applications.

Fortifying Powder

As discussed above, the present disclosure relates to nutritional products comprising a fortifying powder. In certain embodiments, methods of making nutritional products comprising fortifying powders are given. In certain embodiments, methods of making fortifying powders are given. In certain embodiments, fortifying powders suitable for use in nutritional compositions are given.

The fortifying powders of the present disclosure comprise at least one lipophilic nutrient, MDG oil, a phospholipid, and a carrier. The fortifying powder is dried to form a dry powder ingredient which may be immediately added to nutritional compositions. Alternatively, the fortifying powder may be packaged and stored for future use. The fortifying powder of the present disclosure is advantageous from both a manufacturing and a formulation perspective. The fortifying powder may be produced in bulk and stored for later use, which improves manufacturing efficiencies. The fortifying powder may be mixed with a nutritional composition at any convenient stage of the manufacturing process where a dry ingredient may be added, thereby simplifying the manufacturing process of the nutritional composition.

Typically, during the manufacture of a nutritional composition, lipophilic nutrients are dissolved or suspended in a liquefied delivery oil prior to being added to the nutritional composition. The delivery oil often must be heated to liquefy the oil, reduce the viscosity of the oil, or enhance the solubility or dispersion of the lipophilic nutrient. The liquefied delivery oil and lipophilic nutrient must also be thoroughly mixed immediately prior to being added to the nutritional composition, to ensure that the lipophilic nutrient is homogeneously dissolved or dispersed in the delivery oil. A homogeneous dispersal of the lipophilic nutrient in the delivery oil is important for assisting in the homogenous dispersal of the lipophilic nutrient in the nutritional composition. However, these steps of heating or liquefying the delivery oil, adding the lipophilic nutrient, and thoroughly mixing the delivery oil and lipophilic nutrient, immediately before adding the lipophilic nutrient and delivery oil to the nutritional composition, adds both equipment and process complexity to the manufacturing process of the nutritional composition. The fortifying powder of the present disclosure, in contrast, can be manufactured separately, optionally stored, and added to the nutritional composition at any suitable point at which other solid or powdered ingredients are added to the nutritional composition.

The fortifying powder may have an enhanced shelf-life. This enhanced shelf life means that the fortifying powder may be prepared in bulk, and then stored for future use. The stored fortifying powder can be easily added to a nutritional composition at any suitable stage of the manufacturing process, as discussed previously. Preparing the fortifying powder in bulk improves the manufacturing efficiencies and reduces the cost of the fortifying powder and of the nutritional composition containing the fortifying powder.

The fortifying powder may be stable at 23° C. for at least about 1 day to at least about 48 months. The fortifying powder may be stable at 23° C. for at least about 1 day to at least about 36 months. The fortifying powder may be stable at 23° C. for at least about 10 days to at least about 36 months. The fortifying powder may be stable at 23° C. for at least about 6 months to at least about 12 months. The fortifying powder may be stable at 23° C. for at least about 1 day to at least about 24 months. The fortifying powder may be stable at 23° C. for at least about 1 day, 2 days, 3 days, 4 days, 5 days, 6 days, 7 days, 10 days, 14 days, 21 days, 28 days, 1 month, 2 months, 3 months, 4 months, 5 months, 6 months, 7 months, 8 months, 9 months, 10 months, 11 months, 12 months, 15 months, 18 months, 21 months, 24 months, 27 months, 30 months, 33 months, 36 months, 39 months, 42 months, 48 months, or greater than 48 months.

In some embodiments, it may be desirable to mix the lipophilic nutrient with the MDG oil before blending the MDG oil and lipophilic nutrient with other ingredients of the fortifying powder. The lipophilic nutrient may be mixed with the MDG oil in the presence of heat or at ambient temperature and, in some embodiments, with agitation to allow the lipophilic nutrient to dissolve, disperse, or suspend in the MDG oil.

In some embodiments, it may be desirable to mix the MDG oil, the lipophilic nutrient, and the phospholipid to form a first mixture before mixing this first mixture with the other ingredients of the fortifying powder. To make the first mixture, the lipophilic nutrient and phospholipid may be mixed with the MDG oil in the presence of heat or at ambient temperature and, in some embodiments, with agitation to allow the lipophilic nutrient and phospholipid to dissolve, disperse, or suspend in the MDG oil.

In some embodiments, it may be desirable to blend the MDG oil and the phospholipid before blending the lipophilic nutrient with the phospholipid-containing MDG oil. In these embodiments, the phospholipid may be mixed with the MDG oil in the presence of heat or at ambient temperature and, in some embodiments, with agitation to allow the phospholipid to dissolve, disperse, or suspend in the MDG oil. The lipophilic nutrient may then be mixed with the phospholipid-containing MDG oil in the presence of heat or at ambient temperature and, in some embodiments, with agitation to allow the lipophilic nutrient to dissolve, disperse, or suspend in the phospholipid-containing MDG oil.

Lipophilic Nutrient

The fortifying powder comprises at least one lipophilic nutrient. It is known that lipophilic nutrients, when incorporated into a nutritional composition, may be poorly bioavailable when the nutritional composition is consumed by a subject. However, by incorporating the lipophilic nutrient within the fortifying powder, along with the MDG oil, the phospholipid, and the carrier, the lipophilic nutrient may be more stable in the fortifying powder or in the nutritional composition, and more bioavailable when consumed by a subject. Exemplary lipophilic nutrients include lutein, zeaxanthin, astaxanthin, alpha- or beta-cryptoxanthin, beta-carotene, other carotenoids, Coenzyme $Q_{10}$, oil soluble vitamins (e.g., synthetic or natural forms of vitamins A, E, D, or K), lycopene, or combinations thereof. The lipophilic nutrient may be a source of long chain polyunsaturated fatty acids (LCPUFAs). Some examples of LCPUFAs include, but are not limited to, linoleic acid (18:2 n-6), α-linolenic acid (18:3 n-3), γ-linolenic acid (18:3 n-6), stearidonic acid (18:4 n-3), dihomo-γ-linolenic acid (20:3 n-6), eicosatetraenoic (20:4 n-3), arachidonic acid ("ARA," 20:4 n-6), eicosapentaenoic acid ("EPA," 20:5 n-3), and docosahexaenoic acid ("DHA," 22:6 n-3).

It is envisioned that the lipophilic nutrient of the present disclosure may also be a lipophilic pharmaceutical agent. Suitable, non-limiting examples of lipophilic pharmaceutical agents that may be included in the present composition may be selected from: oil soluble drugs (e.g., immunosuppressive agents such as ciclosporin, protease inhibitors such as Ritonavir™ macrolide antibiotics and oil soluble anesthetics such as Propofol™); synthetic and natural forms of steroidal hormones such as estrogens, estradiols, progesterone, testosterone, cortisone, phytoestrogens, dehydroepiandrosterone (DHEA), and growth hormones; oil soluble acids and alcohols (e.g., tartaric acid, lactylic acid, butylated hydroxyanisole, butylated hydroxytoluene, lignin, phytosterols, flavonoids such as quercetin and resveratrol, and diallyl disulfides); and combinations thereof. Additional lipophilic pharmaceutical agents may be found in U.S. patent application Ser. No. 13/452,033, which was filed on Apr. 20, 2012 and is hereby incorporated by reference to the extent that it is consistent with the present disclosure.

Lipophilic nutrients are valuable sources of nutrients for infants, toddlers, children, and adults. Examples of lipophilic nutrients and their properties are as follows.

Lutein

The fortifying powders of the present disclosure may comprise lutein, the bioavailability of which is improved in accordance with the present disclosure.

Lutein is in the class of antioxidants known as carotenoids. The term "lutein" as used herein, unless otherwise specified, refers to one or more of free lutein, lutein esters, lutein salts, or other lutein derivatives or related structures as described herein. Lutein or lutein sources suitable for use in the fortifying powders of the present disclosure include free lutein as well as esters, salts or other derivatives or related structures having the chemical formula:

To provide effective amounts of lutein and MDG oil in the fortifying powders of the present disclosure, lutein is present in amounts relative to the amount of MDG oil in a given fortifying powder. The ratio of the amount of lutein to the amount of MDG oil in the fortifying powder should be from about 0.0003:1 to about 0.04:1 (wt lutein:wt MDG oil). For example, lutein may be present in an amount of about 0.3 mg, about 0.5 mg, about 0.8 mg, about 1 mg, about 5 mg, about 10 mg, about 15 mg, about 20 mg, about 25 mg, about 30 mg, or about 40 mg, of lutein per 1 g of the MDG oil in the fortifying powder. Other ratios of lutein to the MDG oil are within the scope of the present disclosure. Based on the disclosure herein, one skilled in the art may calculate suitable ratios that will allow effective amounts of lutein and MDG oil to be incorporated into the fortifying powder.

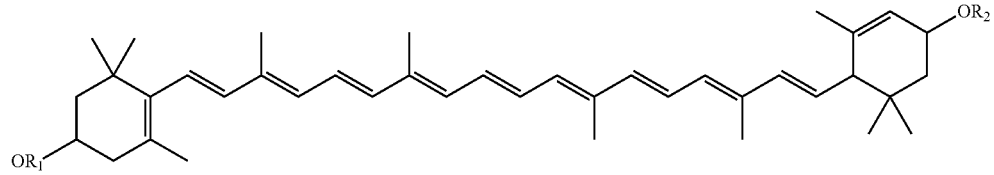

The above chemical formula includes the general structure of lutein and related derivatives or structures. Free lutein, for example, corresponds to the formula wherein R1 and R2 are both hydrogen, and includes cis and trans isomers thereof as well as salts thereof, e.g., sodium or potassium.

Lutein esters suitable for use in the fortifying powders of the present disclosure include any lutein ester of the above formula wherein R1 and R2 are the same or different, and are nutritionally acceptable monovalent salts, hydrogen or carboxylic acid groups, provided that at least one of R1 and R2 is a carboxylic acid group. Suitable lutein esters include both cis and trans isomers. The R1 and R2 moieties may be saturated or unsaturated C1 to C22 fatty acid groups, non-limiting examples of which include formic, acetic, propionic, butyric, valeric, caproic, caprylic, capric, lauric, myristic, palmitic, stearic, and oleic acids.

Lutein is present in the eye, particularly in the retina, where it protects the retina against oxidative damage. Lutein is important for vision development in infants and retinal health in children and adults. Lutein is associated with a lowered risk of age-related cataracts and macular degeneration.

Any natural or synthetic sources of lutein are suitable for use in the fortifying powders disclosed herein, provided that such sources are suitable for use in ingestible compositions and are compatible with the other ingredients in the compositions. Lutein can be provided as an individual ingredient or in any combination with other materials or sources, including sources such as mixed carotenoid premixes. For example, lutein may be provided in a mixture with other carotenoids such as zeaxanthin, astaxanthin, or beta-carotene. Non-limiting examples of suitable lutein sources for use herein include FloraGLO® Crystalline Lutein, available from Kemin Industries, Inc., Des Moines, Iowa, USA, and Lutein 5% DC, available from BASF, Ludwigshafen, Germany.

In a fortifying powder that contains lutein, the lutein is present in the fortifying powder in amounts that will provide effective amounts of lutein in the fortifying powder or, alternatively, in the nutritional compositions to be fortified with the fortifying powder. For example, lutein may be present in an amount of about 0.01 wt %, about 0.025 wt %, about 0.05 wt %, about 0.1 wt %, about 0.2 wt %, about 0.25 wt %, about 0.5 wt %, about 0.75 wt %, about 1 wt %, about 1.25 wt %, about 1.5 wt %, about 1.75 wt %, or about 2 wt %, of lutein, based on the total weight of the fortifying powder. Based on the disclosure herein, one skilled in the art may calculate suitable amounts that will allow effective amounts of lutein to be incorporated into the fortifying powder.

Vitamin D

The fortifying powder of the present disclosure comprise may Vitamin D, the bioavailability of which is improved in accordance with the present disclosure. "Vitamin D" refers to a group of lipophilic nutrients, or "vitamers," related to steroids. There are several vitamers encompassed by the term "Vitamin D," but the most important of these are ergocalciferol, also known as Vitamin $D_2$:

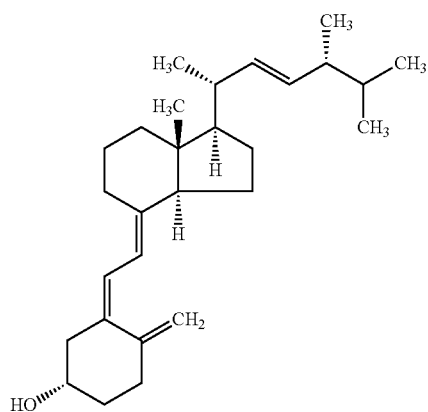

and cholecalciferol, also known as Vitamin $D_3$:

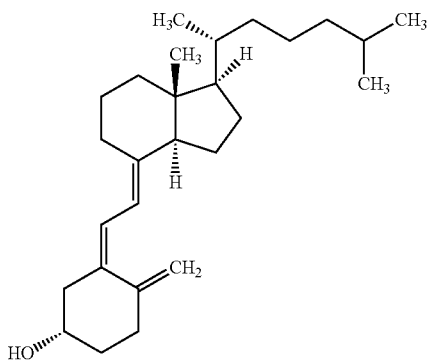 [SMILES: C=C1CC[C@H](O)C/C1=C/C=C1\CCC[C@]2(C)[C@@H]([C@H](C)CCCC(C)C)CC[C@@H]12]

For the purpose of this disclosure, the term "Vitamin D" as used herein, unless otherwise specified, encompasses all forms of Vitamin D, whether as individual vitamers such as Vitamin D2 or Vitamin D3, or as combinations of two or more vitamers.

Vitamin D can be ingested from the diet, and Vitamin D3 is also synthesized in mammalian skin by the reaction of cholesterol with UV radiation from sunlight. Once in the body, Vitamin D vitamers are metabolized into other chemical forms that regulate the concentration of calcium and phosphate in the bloodstream and promote the healthy growth and maintenance of bone.

Any natural or synthetic source of Vitamin D is suitable for use in the fortifying powders disclosed herein, provided that such a source is suitable for use in ingestible compositions and is compatible with the other ingredients in the compositions. Vitamin D can be provided as an individual ingredient or in any combination with other materials or sources, including sources such as multivitamin premixes. For example, Vitamin D may be mixed with other oil-soluble vitamins such as Vitamin A, Vitamin E, or Vitamin K.

Non-limiting examples of suitable Vitamin D sources for use herein include Vitamin D3 provided by BASF Corporation (Florham Park, N.J., USA), Vitamin D3 provided by Fermenta Biotech Ltd. (Kullu, Himachal Pradesh, India), or Quali®-D provided by DSM Nutritional Products AG (Kaiseraugst, Switzerland).

To provide effective amounts of Vitamin D and the MDG oil in fortifying powders of the present disclosure, Vitamin D is present in amounts relative to the amount of the MDG oil in a given composition. The ratio of the amount of Vitamin D to the amount of the MDG oil in the composition should be from about 20 µg Vitamin D per 100 grams of MDG oil to about 50 mg Vitamin D per 100 grams of MDG oil. For example, Vitamin D may be present in an amount of about 20 µg, about 50 µg, about 100 µg, about 250 µg, about 500 µg, about 1 mg, about 5 mg, about 10 mg, about 15 mg, about 20 mg, about 25 mg, or about 50 mg, of Vitamin D per 100 g of the MDG oil in the composition. Other ratios of Vitamin D to the MDG oil are within the scope of the present disclosure. Based on the disclosure herein, one skilled in the art may calculate suitable ratios that will allow effective amounts of Vitamin D and MDG oil to be incorporated into the composition.

In a fortifying powder that contains Vitamin D, the Vitamin D is present in the fortifying powder in amounts that will provide effective amounts of Vitamin D in the fortifying powder or, alternatively, in the nutritional compositions to be fortified with the fortifying powder. For example, Vitamin D may be present in an amount of about 50 µg, about 100 µg, about 500 µg, about 1 mg, about 5 mg, about 10 mg, about 25 mg, about 50 mg, about 75 mg, about 100 mg, or about 125 mg, of Vitamin D per 1 kg of the fortifying powder. Based on the disclosure herein, one skilled in the art may calculate suitable amounts that will allow effective amounts of Vitamin D to be incorporated into the fortifying powder.

Vitamin E and Tocopherols

The fortifying powder of the present disclosure may comprise Vitamin E. The term "Vitamin E" encompasses a family of related chemicals known as tocopherols. Tocopherols comprise a chroman ring and a phytyl tail, conforming to the chemical structure shown in FIG. 1. Tocopherols include RRR-alpha-tocopherol, also sometimes called "natural Vitamin E," and all-rac-alpha-tocopherol, sometimes called "synthetic Vitamin E".

Tocopherols are available in four forms, alpha, beta, gamma, and delta, which differ in the number and position of the methyl ("Me") groups on the chroman ring (see Table 1 below). Alpha-tocopherol is the tocopherol most commonly referred to as "Vitamin E," and is the best known and most studied of the tocopherol family. However, the beta, gamma, and delta forms of tocopherol may also have Vitamin E-type properties in the body, and the U.S. diet actually contains more gamma-tocopherol than alpha-tocopherol.

TABLE 1

| Compound | $R_1$ | $R_2$ | $R_3$ |
| --- | --- | --- | --- |
| alpha-tocopherol | Me | Me | Me |
| beta-tocopherol | Me | H | Me |
| gamma-tocopherol | H | Me | Me |
| delta-tocopherol | H | H | Me |

Tocopherols can exist in a number of stereoisomeric forms because of the three chiral carbons in the molecular structure, marked in FIG. 1 by asterisks ("*"). Each chiral carbon has two possible configurations, R or S, so the presence of three chiral carbons means that there are eight distinct stereoisomers (RRR, SSS, RSR, SRS, etc.) of the tocopherol molecule. Natural Vitamin E is a single stereoisomer, RRR-alpha-tocopherol. RRR-alpha-tocopherol has the greatest biological activity of the stereoisomers, and is reported to be the dominant form of alpha-tocopherol in the brain. However, when alpha-tocopherol is synthetically produced, the manufacturing methods do not preferentially form any specific stereoisomer. Instead, synthetic alpha-tocopherol contains substantially equal amounts of all eight stereoisomers, only one of which is RRR-alpha-tocopherol. In 100 g of synthetic alpha-tocopherol, each stereoisomer constitutes about 12.5 g of the total. Because it is made up of all eight stereoisomers, synthetic alpha-tocopherol is also known as "racemic-" or all-rac-alpha-tocopherol.

Tocopherols are powerful antioxidants which scavenge reactive oxygen species and free radicals before these oxidants can cause damage in living cells. Tocopherols are particularly useful since they are lipophilic and therefore can protect the fatty structures of a cell, such as the cell wall, from oxidative damage. Alpha-tocopherol is thought to prevent or lessen many medical and biological problems associated with oxidative stress. In addition to its antioxidant properties, alpha-tocopherol is thought to reduce inflammation.

Tocopherols are prone to reaction and degradation over time, particularly when purified and stored long-term. Tocopherol esters are more stable for long-term storage, and so tocopherols used in nutritional supplements and to fortify processed foods are often in the form of tocopherol acetate or tocopherol succinate. Once ingested, however, tocopherol esters are quickly converted back to free tocopherol in the digestive tract.

It has long been known that the stereoisomers of alpha-tocopherol differ in their biological activity, with RRR-alpha-tocopherol being the most biologically active form. Accepted nutritional guidelines hold that RRR-alpha-tocopherol is 1.36 times more biologically active than all-rac-alpha-tocopherol. Recent studies have indicated that the biological activity of RRR-alpha-tocopherol may actually be even higher, perhaps about 2 times the activity of all-rac-alpha-tocopherol. This difference in biological activity is not because RRR-alpha-tocopherol is intrinsically a better antioxidant than the other stereoisomers. In vitro studies have shown that all stereoisomers of alpha-tocopherol are equally reactive with oxidative chemicals such as peroxide. Instead, it appears that RRR-alpha-tocopherol is more bioavailable than the other stereoisomers. Compared to the SXX-alpha-tocopherol stereoisomers, the four RXX-alpha-tocopherol stereoisomers are preferentially transferred from the liver into very-low-density lipoproteins (VLDL), and then into plasma and red blood cells. Once in the bloodstream, other organs such as the brain preferentially absorb the RRR-alpha-tocopherol stereoisomer. Hence, certain metabolic systems of the human body actively and preferentially absorb RRR-alpha-tocopherol over the other stereoisomers present in all-rac-alpha-tocopherol.

Alpha-tocopherol is found in many vegetable oils such as sunflower oil, safflower oil, and olive oil. Alpha-tocopherol is also found in seeds, nuts, and some vegetables such as spinach. The form of alpha-tocopherol found in foods is the single stereoisomer, RRR-alpha-tocopherol.

Any natural or synthetic source of Vitamin E (in any combination of single stereoisomers or mixtures of stereoisomers of tocopherol) is suitable for use in the fortifying powders disclosed herein, provided that such a source is suitable for use in ingestible compositions and is compatible with the other ingredients in the compositions. Vitamin E can be provided as an individual ingredient or in any combination with other materials or sources, including sources such as multivitamin premixes. For example, Vitamin E may be mixed with other oil-soluble vitamins such as Vitamin A, Vitamin D, or Vitamin K.

Non-limiting examples of suitable Vitamin E sources for use herein include Vitamin E provided by ZMC-USA (The Woodlands, Tex., USA), Vitamin E provided by Parchem Fine Chemicals (New Rochelle, N.Y., USA), or Quali®-E provided by DSM Nutritional Products AG (Kaiseraugst, Switzerland).

To provide effective amounts of Vitamin E and the MDG oil in fortifying powders of the present disclosure, Vitamin E is present in amounts relative to the amount of the MDG oil in a given composition. The ratio of the amount of Vitamin E to the amount of the MDG oil in the composition should be from about 0.0006:1 to about 0.25:1 (wt Vitamin E:wt MDG oil). For example, Vitamin E may be present in an amount of about 60 mg, about 100 mg, about 150 mg, about 200 mg, about 250 mg, about 500 mg, about 1 g, about 5 g, about 10 g, about 15 g, about 20 g, or about 25 g, of Vitamin E per 100 g of the MDG oil in the composition. Other ratios of Vitamin E to the MDG oil are within the scope of the present disclosure. Based on the disclosure herein, one skilled in the art may calculate suitable ratios that will allow effective amounts of Vitamin E and MDG oil to be incorporated into the composition.

In a fortifying powder that contains Vitamin E, the Vitamin E is present in the fortifying powder in an amount that will provide effective amounts of Vitamin E in the fortifying powder or, alternatively, in the nutritional compositions to be fortified with the fortifying powder. For example, Vitamin E may be present in an amount of about 0.15 mg, about 0.25 mg, about 0.5 mg, about 0.75 mg, about 1 mg, about 5 mg, about 10 mg, about 25 mg, about 50 mg, about 75 mg, about 100 mg, about 125 mg, or about 250 mg, of Vitamin E per 1 g of the fortifying powder. Based on the disclosure herein, one skilled in the art may calculate suitable amounts that will allow effective amounts of Vitamin E to be incorporated into the fortifying powder.

DHA

The fortifying powders of the present disclosure may comprise DHA, the bioavailability of which is improved in accordance with the present disclosure.

DHA is a LCPUFA, an omega-3 fatty acid with 22 carbons in the lipophilic chain, typically found, for example, in cold water fish and algae:

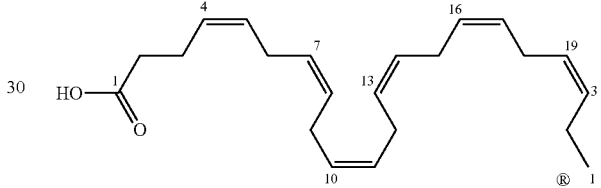

DHA is a primary structural component of the human brain, cerebral cortex, and retina, and is an essential fatty acid for proper development of the eyes, brain, and nervous system of infants and babies. Breast milk contains DHA, and many infant formulas are enriched with DHA because of its crucial role in the growth and development of these systems in infants. There is increasing interest in providing supplemental DHA to pregnant women. DHA is believed to lower the risk of developing lacrimal keratoconjunctivitis, glaucoma, and macular degeneration. DHA is also needed for healthy brain functioning in adults. DHA deficiency may contribute to the decline in mental functioning of healthy older adults, and preliminary studies indicate that early intervention with DHA supplements may improve memory and learning in adults over 50 years of age.

Any natural or synthetic source of DHA is suitable for use in the fortifying powders disclosed herein, provided that such a source is suitable for use in ingestible compositions and is compatible with the other ingredients in the compositions. DHA can be provided as an individual ingredient or in any combination with other materials or sources, including sources such as oils containing other LCPUFAs. For example, DHA may be mixed with other oils containing other LCPUFAs, such as fish oil, or in multivitamin mixtures.

Non-limiting examples of suitable DHA sources for use herein include Life's DHA®, available from DSM Nutritional Products, Kaiseraugst, Switzerland, and Maxomega™ DHA, available from BASF Pharma Ltd., Callanish, Scotland.

To provide effective amounts of DHA and the MDG oil in fortifying powders of the present disclosure, DHA is present in amounts relative to the amount of the MDG oil in a given composition. The ratio of the amount of DHA to the amount of the MDG oil in the composition should be from about 0.06:1 to about 9.5:1 (wt DHA:wt MDG oil). For example, DHA may be present in an amount of about 6 g, about 10 g, about 20 g, about 30 g, about 50 g, about 100 g, about 200 g, about 300 g, about 400 g, about 500 g, about 600 g, about 700 g, about 800 g, about 800 g, or about 950 g, of DHA per 100 g of the MDG oil in the composition. Other ratios of DHA to the MDG oil are within the scope of the present disclosure. Based on the disclosure herein, one skilled in the art may calculate suitable ratios that will allow effective amounts of DHA and MDG oil to be incorporated into the composition.

In a fortifying powder that contains DHA, the DHA is present in the fortifying powder in amounts that will provide effective amounts of DHA in the fortifying powder or, alternatively, in the nutritional compositions to be fortified with the fortifying powder. For example, DHA may be present in an amount of about 10 mg, about 15 mg, about 20 mg, about 25 mg, about 50 mg, about 75 mg, about 100 mg, about 125 mg, or about 250 mg, of DHA per 1 g of the fortifying powder. Based on the disclosure herein, one skilled in the art may calculate suitable amounts that will allow effective amounts of DHA to be incorporated into the fortifying powder.

Monoglyceride and Diglyceride Oil

As discussed previously, the fortifying powders of the present disclosure comprises MDG oil, which comprises a blend of a monoglycerides and diglycerides ("MDG oil"). Monoglycerides are glycerides consisting of one fatty acid group bonded to a glycerol molecule through ester linkages. Monoglycerides are normal metabolites in the body formed during the breakdown of triglycerides and diglycerides. Diglycerides are glycerides consisting of two fatty acid groups bonded to a glycerol molecule through ester linkages. Non-limiting examples of commercial sources of monoglycerides and diglycerides include natural sources or synthetic sources. Natural sources include animal fats, such as animal-derived (e.g., cow- or hog-derived) glycerides, or vegetable oils, such as glycerides derived from corn, soybean, sunflower, safflower or coconut oil. In some embodiments, the mixture of monoglycerides and diglycerides in the MDG oil may be derived from the hydrolysis of triglycerides in safflower, corn, or sunflower oil.

The fortifying powders according to the disclosure may comprise MDG oil in amounts of from about 6 wt % to about 50 wt %, including from about 6.5 wt % to about 50 wt %, including from about 7 wt % to about 45 wt %, including from about 7.5 wt % to about 42 wt %, including from about 8 wt % to about 40 wt %, including from about 8.5 wt % to about 37 wt %, including from about 9 wt % to about 35 wt %, including from about 9.5 wt % to about 30 wt %, including from about 10 wt % to about 25 wt %, and also including from about 15 wt % to about 20 wt %, of MDG oil as a percentage of the weight of the fortifying powder. In some embodiments, the composition may include from about 12.5 wt % to about 22 wt % of the MDG oil, as a percentage of the weight of the fortifying powder.

The MDG oil according to the present disclosure comprises monoglycerides in an amount of at least 5 wt %, including from about 5 wt % to about 95 wt %, including from about 20 wt % to about 80 wt %, including from about 25 wt % to about 60 wt %, including from about 30 wt % to about 55 wt %, including from about 32 wt % to about 52 wt %, and including from about 36 wt % to about 47 wt %, by weight of the MDG oil. The diglycerides in the MDG oil comprise at least about 5 wt %, including from about 5 wt % to about 95 wt %, including from about 10 wt % to about 80 wt %, including from about 20 wt % to about 70 wt %, including from about 22 wt % to about 64 wt %, including from about 40 wt % to about 60 wt %, and including from about 45 wt % to about 55 wt %, by weight of the MDG oil.

In some embodiments, the MDG oil may comprise triglycerides. In a preferred embodiment, triglycerides comprises no more than about 20 wt %, no more than about 15 wt %, no more than about 10 wt %, no more than about 5 wt %, no more than about 2 wt %, or no more than about 1 wt %, by weight of the MDG oil. The MDG oil may also comprise free fatty acids and free glycerol. The free fatty acids and free glycerol typically comprise less than about 10 wt %, preferably less than 5 wt %, more preferably less than 2 wt %, by weight of the MDG oil. Exemplary embodiments of the MDG oil may consist of or consist essentially of monoglycerides, diglycerides, and no more than about 20 wt % triglycerides by weight of the MDG oil. Other exemplary embodiments of the MDG oil may consist of or consist essentially of monoglycerides and diglycerides.

For the MDG oil according to the present disclosure, the fatty acid groups in the monoglycerides, diglycerides, and triglycerides may be the same or different. Similarly, any free fatty acids in the MDG oil may be the same as or different from the fatty acid groups in the monoglycerides, diglycerides, or triglycerides.

The MDG oil according to the disclosure may comprise fatty acids that contain at least 14 carbon atoms in their lipophilic chains. Preferably, these fatty acids contain from 14 to 24 carbon atoms. More preferably, these fatty acids contain from 14 to 20 carbon atoms. These fatty acids may be selected from the group consisting of myristic acid, palmitic acid, stearic acid, arachidic acid, behenic acid, palmitoleic acid, oleic acid, linoleic acid, alpha-linolenic acid, gamma-linolenic acid, stearidonic acid, arachidonic acid, eicosapentaenoic acid, docosahexaenoic acid, and combinations thereof. The fatty acids containing chain lengths from 14 to 24 carbon atoms may comprise at least about 70%, at least about 75%, at least about 80%, at least about 85%, at least about 90%, or at least about 95%, of the fatty acids in the MDG oil.

Preferably, the MDG oil primarily comprises fatty acids with 18 carbon atoms in the lipophilic chain. Fatty acids with 18 carbon atoms may be selected from the group consisting of stearic acid, oleic acid, linoleic acid, alpha-linolenic acid, gamma-linolenic acid, stearidonic acid, and combinations thereof. The MDG oil may comprise, by percentage of fatty acids, from about 50% to about 95%, preferably about 60% to about 95%, fatty acids with 18 carbons in the lipophilic chain, provided, however, that polyunsaturated fatty acids of any chain length provide less than about 10% of the fatty acids in the MDG oil.

The MDG oil according to the disclosure may comprise monounsaturated fatty acids. The monounsaturated fatty acids may be selected from the group consisting of palmitoleic acid, oleic acid, and combinations thereof. The monounsaturated fatty acids may comprise at least about 50%, at least about 55%, at least about 60%, at least about 64%, at least about 68%, at least about 70%, at least about 75%, at least about 80%, or at least about 85%, of the fatty acid groups in the MDG oil. The MDG oil according to the disclosure may also comprise polyunsaturated fatty acids. The polyunsaturated fatty acids comprise less than about 10% of the fatty acids in the MDG oil, preferably less than about 8%, more preferably less than about 5%, of the fatty acids in the MDG oil.

The MDG oil may also include trace amounts of other additives such as antioxidants, surfactants, emulsifiers, flavorants, colorants, and stabilizers. The use of such additives is well known in the art.

Phospholipids

As discussed previously, the fortifying powder of the present disclosure comprises at least one phospholipid. Phospholipids are related to triglycerides, in that they that have a glycerol backbone, with two fatty acid groups and a phosphate group attached to the glycerol. A polar molecule is also attached to the phosphate group. The polar molecule and phosphate group create a hydrophilic region at one end of the phospholipid molecule, while the two fatty acids create a lipophilic (i.e., hydrophobic) region at the other end of the phospholipid molecule. Therefore, phospholipids may have emulsifying and surfactant properties. Phospholipids comprise an important component of biological cell membranes. Exemplary phospholipids include, but are not limited to, lecithin, choline, phosphatidylcholine, phosphatidylethanolamine, phosphatidylinositol, phosphatidic acid, phosphatidyl serine, lysophosphatides, and combinations thereof.

Choline

The phospholipid in the fortifying powder may comprise choline. Choline may act as both a nutrient within the fortifying powder, as well as an agent that enhances the bioavailability of the lipophilic nutrient.

Choline acts as a source of methyl groups for the biosynthesis of other methylated products. It is the precursor of the neurotransmitter acetylcholine. It has been proved that the administration of choline is beneficial in patients suffering from any disorder related to defective cholinergic neurotransmission.

Choline is also a major component, along with lecithin, of phospholipids and sphingomyelin. By virtue of its fundamental functions in membrane structure, a choline deficiency causes a whole range of phospholipid abnormalities which express themselves clinically as fatty liver, kidney lesions (hemorrhagic renal necrosis), and impairment of lipoprotein metabolism. With a diet deficient in choline, cholesterol esters and fats accumulate in the liver.

Choline chloride and bitartrate are mentioned in the US Code of Federal Regulations as nutrition/dietary supplements which have been accorded GRAS status (Generally Recognized as Safe).

Choline may be added to the fortifying powder at different stages during the preparation of the fortifying powder. For example, in one embodiment, the MDG oil may be mixed with the lipophilic nutrient, and then choline is added to the MDG oil mixture. In another embodiment, the MDG oil, lipophilic nutrient, and choline may be mixed to form a mixture. In another embodiment, the MDG oil may be mixed with choline, and then the lipophilic nutrient is added to the MDG oil mixture.

Choline may be in the fortifying powder at about 1 wt % to about 12 wt %, as a percentage of the weight of the fortifying powder. Choline may be in the fortifying powder at about 1.1 wt % to about 11 wt %, including about 1.2 wt % to about 10 wt %, about 1.4 wt % to about 9 wt %, about 1.5 wt % to about 8 wt %, about 1.7 wt % to about 7 wt %, about 1.8 wt % to about 6 wt %, about 1.9 wt % to about 5 wt %, about 2 wt % to about 4.5 wt %, about 2.2 wt % to about 4.3 wt %, about 2.4 wt % to about 4.1 wt %, about 2.6 wt % to about 4 wt %, about 2.8 wt % to about 3.8 wt %, and about 3.0 wt % to about 3.5 wt %, as a percentage of the weight of the fortifying powder. Choline may be in the fortifying powder at about 1 wt %, at about 1.1 wt %, at about 1.2 wt %, at about 1.3 wt %, at about 1.4 wt %, at about 1.5 wt %, at about 1.6 wt %, at about 1.7 wt %, at about 1.8 wt %, at about 1.9 wt %, at about 2.0 wt %, at about 2.3 wt %, at about 2.5 wt %, at about 2.7 wt %, at about 2.9 wt %, at about 3 wt %, at about 3.1 wt %, at about 3.3 wt %, at about 3.5 wt %, at about 3.7 wt %, at about 3.9 wt %, at about 4 wt %, at about 4.1 wt %, at about 4.3 wt %, at about 4.5 wt %, at about 4.7 wt %, at about 4.9 wt %, at about 5 wt %, at about 5.5 wt %, at about 6 wt %, at about 6.5 wt % at about 7 wt %, at about 7.5 wt %, at about 8 wt %, at about 8.5 wt %, at about 9 wt %, at about 9.5 wt %, at about 10 wt %, at about 11 wt %, and at about 12 wt %, as a percentage of the weight of the fortifying powder.

Lecithin

The phospholipid in the fortifying powder may comprise lecithin. Lecithin may act as both a nutrient source within the fortifying powder, as well as an agent that enhances the bioavailability of the lipophilic nutrient.

Lecithin is predominantly a mixture of glycerol phospholipids (e.g., phosphatidylcholine, phosphatidylethanolamine, and phosphatidylinositol). Phosphatidylcholine is typically the major glycerol phospholipid component. Lecithin may also contain other compounds such as free fatty acids, monoglycerides, diglycerides, triglycerides, glycolipids, and other lipid/fatty acid containing compounds. Lecithins are sometimes classified as glycerol phospholipids or phosphatides. This class of compounds has amphiphilic properties and thus, emulsifying functionality.

Lecithin is approved by the United States Food and Drug Administration for human consumption with the status "Generally Recognized As Safe." Non-limiting examples of lecithin suitable for use herein include egg lecithin, wheat lecithin, corn lecithin, soy lecithin, modified lecithin, and combinations thereof. Lecithin may be provided in deoiled or liquid form, or phosphatidylcholine enriched form. Additionally, lecithin may be derived from sources that include, but are not limited to organic soy, canola oil, nonfat dry milk, or whey protein.

In one embodiment, the fortifying powder may comprise deoiled lecithin, wherein the deoiled lecithin comprises about 1% water; about 3% triglycerides; about 24% phosphatidylcholine; about 20% phosphatidylethanolamine; about 14% phosphatidylinositol; about 7% phosphatidic acid; about 8% minor phospholipids; about 8% complexed sugars; and about 15% glycolipids.

In another embodiment, the fortifying powder may comprise liquid lecithin, wherein the liquid lecithin comprises about 1% water; about 37% triglycerides; about 16% phosphatidylcholine; about 13% phosphatidylethanolamine; about 10% phosphatidylinositol; about 5% phosphatidic acid; about 2% minor phospholipids; about 5% complexed sugars; and about 11% glycolipids.

Lecithin suitable for use herein may be obtained from any known or otherwise suitable nutrition source. Non-limiting examples include soy lecithin from ADM Specialty Food Ingredients, Decatur, Ill., USA; soy lecithin from Solae, LLC, St. Louis, Mo., USA; and soy lecithin from American Lecithin Company, Oxford, Conn., USA.

Lecithin may be added to the fortifying powder at different stages during the preparation of the fortifying powder. For example, in one embodiment, the MDG oil may be mixed with the lipophilic nutrient, and then lecithin is added to the MDG oil mixture. In another embodiment, the MDG oil, lipophilic nutrient, and lecithin may be mixed to form a mixture. In another embodiment, the MDG oil may be mixed with lecithin, and then the lipophilic nutrient is mixed with the MDG oil mixture.

Lecithin may be in the fortifying powder at about 1 wt % to about 12 wt %, as a percentage of the weight of the fortifying powder. Lecithin may be in the fortifying powder at about 1.1 wt % to about 11 wt %, including about 1.2 wt % to about 10 wt %, about 1.4 wt % to about 9 wt %, about 1.5 wt % to about 8 wt %, about 1.7 wt % to about 7 wt %, about 1.8 wt % to about 6 wt %, about 1.9 wt % to about 5 wt %, about 2 wt % to about 4.5 wt %, about 2.2 wt % to about 4.3 wt %, about 2.4 wt % to about 4.1 wt %, about 2.6 wt % to about 4 wt %, about 2.8 wt % to about 3.8 wt %, and about 3.0 wt % to about 3.5 wt %, as a percentage of the weight of the fortifying powder. Lecithin may be in the fortifying powder at about 1 wt %, at about 1.1 wt %, at about 1.2 wt %, at about 1.3 wt %, at about 1.4 wt %, at about 1.5 wt %, at about 1.6 wt %, at about 1.7 wt %, at about 1.8 wt %, at about 1.9 wt %, at about 2.0 wt %, at about 2.3 wt %, at about 2.5 wt %, at about 2.7 wt %, at about 2.9 wt %, at about 3 wt %, at about 3.1 wt %, at about 3.3 wt %, at about 3.5 wt %, at about 3.7 wt %, at about 3.9 wt %, at about 4 wt %, at about 4.1 wt %, at about 4.3 wt %, at about 4.5 wt %, at about 4.7 wt %, at about 4.9 wt %, at about 5 wt %, at about 5.5 wt %, at about 6 wt %, at about 6.5 wt % at about 7 wt %, at about 7.5 wt %, at about 8 wt %, at about 8.5 wt %, at about 9 wt %, at about 9.5 wt %, at about 10 wt %, at about 11 wt %, and at about 12 wt %, as a percentage of the weight of the fortifying powder.

Carriers

As discussed previously, the fortifying powder of the present disclosure comprises a carrier. The carrier may be any solid or semisolid compound that is suitable for use in ingestible compositions and is compatible with the other ingredients in the composition. Preferred solid or semisolid carriers include water soluble or water suspendible macronutrients. Suitable carriers include, but are not limited to, carbohydrates and proteins. Exemplary carbohydrate carriers include: simple sugars (e.g., glucose, fructose, or sucrose); complex sugars (e.g., maltodextrins, fructo-oligosaccharides, or inulin); starches (e.g., corn starch modified corn starch, potato starch, or rice starch); cellulosics (e.g., powdered cellulose, microcrystalline cellulose, or hemicellulose), sugar alcohols (e.g., xylitol, mannitol, sorbitol, or maltitol); and combinations thereof. Exemplary protein carriers include milk proteins (e.g., casein, caseinate, or whey); animal proteins (e.g., beef, poultry, or fish); vegetable proteins (e.g., bean, pea, or potato); cereal proteins (e.g., rice or wheat), and combinations thereof. A preferred example of a suitable carrier is nonfat dry milk powder, which comprises a combination of simple sugars (e.g., lactose) and proteins (e.g., casein and whey).

The carrier may also be in the form of an aqueous solution, emulsion, or suspension comprising a compound that is suitable for use in ingestible compositions and is compatible with the other ingredients in the composition. Preferred liquid carriers comprise water and water soluble or water suspendible macronutrients. Suitable liquid carriers include, but are not limited to, liquids comprising carbohydrates or proteins. Exemplary liquid carriers include fluid whole milk, fluid skim milk, fluid condensed milk, fluid evaporated milk, aqueous starch slurries, liquid sugar solutions, corn syrups, diluted corn syrups, honey, diluted honey, and combinations thereof. A preferred example of a suitable liquid carrier is fluid skim milk, which comprises a combination of simple sugars (e.g., lactose) and proteins (e.g., casein and whey).

The carrier may be in the fortifying powder at about 40 wt % to about 88 wt %, as a percentage of the weight of the fortifying powder. The carrier may be in the fortifying powder at about 42 wt % to about 85 wt %, including about 45 wt % to about 82 wt %, about 48 wt % to about 80 wt %, about 50 wt % to about 78 wt %, about 52 wt % to about 75 wt %, about 55 wt % to about 72 wt %, about 58 wt % to about 70 wt %, about 60 wt % to about 68 wt %, about 62 wt % to about 66 wt %, and about 63 wt % to about 65 wt %, as a percentage of the weight of the fortifying powder. The carrier may be in the fortifying powder at about 40 wt %, at about 43 wt %, at about 46 wt %, at about 49 wt %, at about 50 wt %, at about 53 wt %, at about 56 wt %, at about 59 wt %, at about 60 wt %, at about 64 wt %, at about 67 wt %, at about 70 wt %, at about 73 wt %, at about 75 wt %, at about 77 wt %, at about 80 wt %, at about 84 wt %, at about 86 wt %, and at about 88 wt %, as a percentage of the weight of the fortifying powder.

The carrier may be added to the fortifying powder at different stages during the preparation of the fortifying powder. In a preferred embodiment, the carrier is dissolved or suspended in an aqueous solution or suspension. This aqueous liquid comprising the carrier is mixed with the mixture of the MDG oil, lipophilic nutrient, and phospholipid.

Base Nutritional Composition

As discussed above, the fortifying powder may be blended with a base nutritional composition to form a nutritional product. The base nutritional composition is a nutritional composition prior to being mixed with a fortifying powder. Base nutritional compositions comprise at least one of protein, carbohydrate, and fat, and are suitable for enteral administration to a subject. Base nutritional compositions may further comprise vitamins, minerals, and other ingredients, and represent sole, primary, or supplemental sources of nutrition.

Macronutrients

Base nutritional compositions according to the present disclosure may comprise one or more macronutrients selected from the group of fat, protein, carbohydrate, and mixtures thereof. Generally, any source of fat, carbohydrate, or protein that is suitable for use in nutritional products is also suitable for use herein, provided that such macronutrients are also compatible with the essential elements of the fortifying powders and nutritional compositions as defined herein.

Although total concentrations or amounts of fat, protein, and carbohydrates may vary depending upon the nutritional needs of the subject, such concentrations or amounts most typically fall within one of the following embodied ranges, inclusive of any other essential fat, protein, and or carbohydrate ingredients as described herein.

Carbohydrate concentrations may typically range from about 5 wt % to about 70 wt %, including from about 7 wt % to about 60 wt %, including from about 10 wt % to about 55 wt %, by weight of the base nutritional composition. Fat concentrations most typically range from about 0.5 wt % to about 50 wt %, including from about 0.75 wt % to about 40 wt %, including from about 1 wt % to about 35 wt %, including from about 1.25 wt % to about 30 wt %, including from about 1.5 wt % to about 28 wt %, including from about 1.75 wt % to about 25 wt %, including from about 2 wt % to about 20 wt %, including from about 2.25 wt % to about 15 wt %, including from about 2.5% to about 10 wt %, and also including from about 2.5 wt % to about 5 wt %, by weight of the base nutritional composition. Protein concentrations may range from about 1 wt % to about 85 wt %, from about 5 wt % to about 50 wt %, from about 7 wt % to about 32 wt %, or from about 8 wt % to about 30 wt %, by weight of the base nutritional composition. Additional ranges for carbohydrates, fats, and proteins, based on percent of calories of the base nutritional composition, are set forth in Table 2.

TABLE 2

| Macronutrient | Embodiment A (% Calories) | Embodiment B (% Calories) | Embodiment C (% Calories) |
| --- | --- | --- | --- |
| Carbohydrate | 1-98 | 0-75 | 30-50 |
| Fat | 1-98 | 20-70 | 35-40 |
| Protein | 1-98 | 5-85 | 15-85 |

Note:
Each numerical value in the table is preceded by the term "about."

Non-limiting examples of suitable fats in the base nutritional compositions described herein may be selected from the group of coconut oil, fractionated coconut oil, soy oil, corn oil, olive oil, safflower oil, high oleic safflower oil, medium chain triglyceride oil, sunflower oil, high oleic sunflower oil, palm and palm kernel oils, palm olein, canola oil, marine oils, cottonseed oil, borage oil, algal oils, fungal oils, and combinations thereof.

Non-limiting examples of suitable carbohydrates or sources thereof in the base nutritional compositions may be selected from the group of maltodextrin, hydrolyzed or modified starch or cornstarch, glucose polymers, corn syrup, corn syrup solids, rice-derived carbohydrates, sucrose, glucose, fructose, lactose, high fructose corn syrup, honey, sugar alcohols (e.g., maltitol, erythritol, or sorbitol), and combinations thereof.

Non-limiting examples of suitable protein or sources thereof in the base nutritional compositions may be selected from the group of partially hydrolyzed or non-hydrolyzed proteins derived from any suitable source, such as milk (e.g., casein, caseinate, or whey), animal (e.g., beef, poultry, or fish), cereal (e.g., rice or wheat), vegetable (e.g., pea, potato, or bean), or combinations thereof. Non-limiting examples of such proteins include whole cow's milk, partially or completely defatted milk, milk protein isolates, milk protein concentrates, caseinates, casein protein isolates, whey protein, whey protein concentrates, soy protein isolates, soy protein concentrates, pea protein isolates, pea protein concentrates, hydrolyzed yeast, potato, rice, wheat, canola, animal collagen, gelatin, bovine colostrum, human colostrum, glycomacropeptides, mycoproteins, amino acids, and combinations thereof.

In some embodiments, the base nutritional compositions include a protein component that consists of only intact or partially hydrolyzed protein; that is, the protein component is substantially free of any protein that has a degree of hydrolysis of 25% or more. In this context, the term "partially hydrolyzed protein" refers to proteins having a degree of hydrolysis of less than 25%, including less than 20%, including less than 15%, including less than 10%, and including proteins having a degree of hydrolysis of less than 5%. The degree of hydrolysis is the extent to which peptide bonds are broken by a hydrolysis chemical reaction. To quantify the partially hydrolyzed protein component of these embodiments, the degree of protein hydrolysis is determined by quantifying the amino nitrogen to total nitrogen ratio (AN/TN) of the protein component of the selected composition. The amino nitrogen component is quantified by USP titration methods for determining amino nitrogen content, while the total nitrogen component is determined by the Tecator® Kjeldahl method. These analytical methods are well known.

Optional Ingredients

The base nutritional compositions described herein may further comprise other optional ingredients that may modify the physical, chemical, hedonic, or processing characteristics of the base nutritional compositions or serve as additional nutritional components when used for a targeted population. Many such optional ingredients are known or otherwise suitable for use in other nutritional products and may also be used in the base nutritional compositions described herein, provided that such optional ingredients are safe and effective for oral administration and are compatible with the essential and other ingredients in the selected product form.

Non-limiting examples of such optional ingredients include preservatives, antioxidants, emulsifying agents, buffers, additional nutrients as described herein, colorants, flavors, thickening agents, stabilizers, and so forth.

The base nutritional compositions may further comprise minerals, non-limiting examples of which include calcium, phosphorus, magnesium, iron, zinc, manganese, copper, sodium, potassium, molybdenum, chromium, selenium, chloride, and combinations thereof.

The base nutritional compositions may further comprise vitamins or related nutrients, non-limiting examples of which include vitamin A, vitamin D, vitamin E, vitamin K, thiamine, riboflavin, pyridoxine, vitamin B12, other carotenoids, niacin, folic acid, pantothenic acid, biotin, vitamin C, choline, inositol, salts and derivatives thereof, and combinations thereof.

In some embodiments, the base nutritional compositions may comprise a compound selected from the group of hydroxyl methyl butyrate, leucine, beta-alanine, epigallocatechin gallate, human milk oligosaccharides, prebiotics, probiotics, and combinations thereof.

The base nutritional compositions may also include one or more masking agents to reduce or otherwise obscure bitter flavors and after taste. Suitable masking agents include natural and artificial sweeteners, sodium sources such as sodium chloride, and hydrocolloids, such as guar gum, xanthan gum, carrageenan, gellan gum, and combinations thereof. The amount of masking agent in the base nutritional composition may vary depending upon the particular masking agent selected, other ingredients in the composition, and other composition or product target variables. Such amounts, however, most typically range from at least 0.1 wt %, including from about 0.15 wt % to about 3.0 wt %, and also including from about 0.18 wt % to about 2.5 wt %, by weight of the base nutritional composition.

Methods of Manufacture

The various embodiments of fortifying powders, base nutritional compositions, and nutritional products may be prepared by any process or suitable method for making the selected product form, such as a liquid, semi-liquid, or powder compositions.

Fortifying Powder

To prepare a fortifying powder having improved bioavailability of one or more lipophilic nutrients, a method in accordance with the present disclosure may be utilized. The method may comprise the steps of: forming a first mixture comprising an MDG oil, a lipophilic nutrient, and a phospholipid; mixing an aqueous liquid comprising a carrier with the first mixture to form a second mixture; and drying the second mixture to form a fortifying powder.

In one suitable manufacturing process for preparing a fortifying powder, a mixture comprising an MDG oil, one or more lipophilic nutrients, and a phospholipid forms a first mixture. The order in which the components of the first mixture are added is not critical, although it is generally preferred that the MDG oil be the first or second component added to the first mixture. In certain embodiments, the MDG oil is mixed with one or more lipophilic nutrients, and the phospholipid is added afterward. In certain embodiments, the MDG oil is mixed with one or more lipophilic nutrients, and the phospholipid and one or more additional lipophilic nutrients are added afterward. In certain embodiments, the MDG oil is mixed with the phospholipid, and one or more lipophilic nutrients are added afterward. In certain embodiments, the MDG oil is mixed with one or more lipophilic nutrients and the phospholipid concurrently, and one or more additional lipophilic nutrients are added afterward. The first mixture may be formed by heating the MDG oil prior to adding other ingredients, or the first mixture may be heated while being mixed, optionally with agitation, to enhance the dissolution or dispersal of the ingredients of the first mixture into a homogenous mixture. In some embodiments, the first mixture is heated to about 85° F. (about 29° C.) for 30 minutes. In some embodiments, the first mixture is heated to about 120° F. (about 49° C.) for about 10 minutes. A person of skill in the art will appreciate that the composition of the first mixture will affect the temperature and time required for heating and adequately mixing the first mixture.

The first mixture is mixed with the carrier. In some embodiments, an aqueous liquid comprising the carrier is mixed with the first mixture to form a second mixture. In some embodiments, the carrier may be dissolved or suspended in the aqueous liquid prior to being mixed with the first mixture. In some embodiments, the carrier may be an aqueous liquid carrier that is mixed with the first mixture to form a second mixture. In some embodiments, the carrier and first mixture are mixed concurrently in the aqueous liquid.

After the ingredients of the second mixture have been mixed, the second mixture is dried to form a fortifying powder by any known techniques suitable for making and formulating a powder. In some embodiments, the second mixture may be dried by a spray drying step or by a freeze drying step. The spray drying step may include any spray drying technique that is suitable for use in the production of powders. Different spray drying methods and techniques are known for use in the nutrition field, all of which are suitable for use in the manufacture of the fortifying powders disclosed herein. In some embodiments, the second mixture may be extruded and dried through an extrusion process. Different extrusion processes are known for use in the nutrition field, all of which are suitable for use in the manufacture of the fortifying powders disclosed herein. In some embodiments, the second mixture is dried to form a free particle fortifying powder.

Following drying, the fortifying powder may be immediately blended into a base nutritional composition, to form a nutritional product. In some embodiments, the fortifying powder may be added to a completed base nutritional emulsion to form a nutritional product emulsion. In some embodiments, the fortifying powder may be added to a base nutritional emulsion at a suitable stage during the manufacture of the base nutritional emulsion, to form a nutritional product emulsion. In some embodiments, the fortifying powder may be added to a base nutritional emulsion concurrently with one of the slurries (e.g., the CHO-MIN, PIF, or PIW slurry), described below, during the manufacture of the base nutritional emulsion, to form a nutritional product emulsion. In some embodiments, the nutritional product emulsion may then be dried to form a nutritional product powder, using any methods known in the art. In some embodiments, the fortifying powder may be dry blended with a base nutritional powder, to form a nutritional product powder. In some embodiments, the free particle fortifying powder may be dry blended with a base nutritional powder to form a nutritional product powder.

Alternatively, the fortifying powder may be stored for later processing, packaged into suitable containers or other packaging, and the like.

Base Nutritional Composition

In one suitable manufacturing process for preparing a base nutritional composition, at least three separate slurries are prepared, including a protein-in-fat (PIF) slurry, a carbohydrate-mineral (CHO-MIN) slurry, and a protein-in-water (PIW) slurry. The PIF slurry is formed by heating and mixing an oil (e.g., soy oil, canola oil, or corn oil) and then adding an emulsifier (e.g., lecithin), fat soluble vitamins, and at least a portion of the total protein (e.g., milk protein concentrate) with continued heat and agitation. The CHO-MIN slurry is formed by adding to water, with heat and agitation, minerals (e.g., potassium citrate, dipotassium phosphate, or sodium citrate), including trace and ultra trace minerals (TM/UTM premix), and thickening or viscosity agents (e.g., cellulose gel, gellan, or carrageenan). The resulting slurry is held for 10 minutes with continued heat and agitation before adding additional minerals (e.g., potassium chloride, magnesium carbonate, or potassium iodide) and the carbohydrates (e.g., sucrose or corn syrup) to complete the CHO-MIN slurry. The PIW slurry is formed by mixing water and the remaining protein with heat and agitation.

In accordance with this process, the three slurries are mixed together with heat and agitation. The pH is adjusted to the desired range, e.g., from 6.6 to 7, after which the composition is subjected to high-temperature short-time ("HTST") processing. The composition is heat treated, emulsified, homogenized, and cooled during the HTST process. Water soluble vitamins and ascorbic acid are added (if applicable), the pH is again adjusted (if necessary), flavors are added, and any additional water is added to adjust the solids content to the desired range.

In some embodiments, after all slurries and other ingredients of the base nutritional emulsion have been mixed and processed as previously described, a fortifying powder of the present disclosure may be added to the base nutritional emulsion, as described above. In some embodiments, a fortifying powder may be added to the base nutritional emulsion at a suitable stage during the manufacture of the base nutritional emulsion, to form a nutritional product emulsion. In some embodiments, a fortifying powder may be added to the base nutritional emulsion concurrently with one of the slurries (e.g., the CHO-MIN, PIF, or PIW slurry) during the manufacture of the base nutritional emulsion, to form a nutritional product emulsion. The resulting nutritional product emulsion optionally may be packaged and sterilized according to any suitable sterilization technique (e.g., aseptic, retort, hot-fill, chemical, radiation, or filtering sterilization techniques).

Alternatively, after all slurries and other ingredients of the base nutritional composition have been mixed and processed as previously described, the base nutritional composition may be dried to form a base nutritional powder using any known techniques suitable for making and formulating a powder. For example, the base nutritional powder may be dried by a spray drying step or by a freeze drying step. The spray drying step may include any spray drying technique that is suitable for use in the production of powders. Many different spray drying methods and techniques are known for use in the nutrition field, all of which are suitable for use in the manufacture of the spray dried base nutritional powders disclosed herein.

Following drying, the finished base nutritional powder may be immediately dry blended with the fortifying powder, or the base nutritional powder may be stored for future processing, packaged into suitable containers, and the like.

Nutritional Product

The nutritional product of the present disclosure is manufactured by mixing a fortifying powder with a base nutritional composition, as previously discussed. In some embodiments of suitable manufacturing processes for preparing the nutritional product, the fortifying powder may be added to the completed base nutritional emulsion to form a nutritional product emulsion. In some embodiments, the fortifying powder may be added to the base nutritional emulsion at a suitable stage during the manufacture of the base nutritional emulsion, to form a nutritional product emulsion. In some embodiments, the fortifying powder may be added to the base nutritional emulsion concurrently with one of the slurries (e.g., the CHO-MIN, PIF, or PIW slurry), described above, during the manufacture of the base nutritional emulsion, to form a nutritional product emulsion. In some embodiments, the nutritional product emulsion from any of these embodiments may then be dried to form a nutritional product powder, using any methods known in the art. In some embodiments, the fortifying powder may be dry blended with a base nutritional powder, to form a nutritional product powder. In some embodiments, the free particle fortifying powder may be dry blended with a base nutritional powder to form a nutritional product powder.

The fortifying powder may be added to the base nutritional composition at about 0.1 wt % to about 16 wt %, including about 0.2 wt % to about 15 wt %, about 0.3 wt % to about 14 wt %, about 0.5 wt % to about 12.5 wt %, about 0.75 wt % to about 10 wt %, about 1 wt % to about 8 wt %, about 1.25 wt % to about 7.5 wt %, about 1.5 wt % to about 6 wt %, about 2 wt % to about 5 wt %, about 2.25 wt % to about 4 wt %, and about 2.5 wt % to about 3 wt %, as a percentage of the weight of the resulting nutritional product.

Methods of Use

The nutritional products and fortifying powders described herein improve the bioavailability of lipophilic nutrients present in the nutritional products and fortifying powders. Without wishing to be bound by theory, it is believed that, upon consumption, the MDG oil, phospholipid, and carrier in the fortifying powder improves the dissolution or dispersion of the lipophilic nutrient within the fortifying powder and, ultimately, within the nutritional product. Improved dissolution or dispersion of the lipophilic nutrient allows the lipophilic nutrient to incorporate more easily into the micelles formed in the gut. The combination and interaction of the components in the fortifying powder may also assist the lipophilic nutrient to incorporate more easily into the micelles formed in the gut. The monoglycerides and diglycerides in the fortifying powder may also enhance the formation of chylomicrons. Therefore, lipophilic nutrients are more efficiently delivered to the brush border of the intestine and absorbed into the body.

In embodiments in which the lipophilic nutrient is lutein, nutritional products including lutein can be administered to subjects to promote healthy eye and retina development, maintain overall eye health, and prevent or reduce age-related macular degeneration and other retinal diseases and disorders. The subjects receiving the nutritional products with lutein may include, but are not limited to, pregnant and post-natal women, infants, children, and adults. In some embodiments, the methods of the present disclosure may be directed to pregnant or post-natal women, to promote eye and retina development and healthy vision in the developing fetus or infant. In some embodiments, the methods of the present disclosure may be directed to infants and children, to promote eye and retina development and healthy vision in the growing child. In some embodiments, the methods of the present disclosure may be directed to adults who have age-related macular degeneration or other retinal diseases and disorders. In some embodiments, the methods of the present disclosure are also directed to "at risk" individuals, including individuals unaffected by or not otherwise afflicted with age-related macular degeneration or other retinal diseases or disorders, for the purpose of preventing, minimizing, or delaying the development of such diseases and conditions over time. For such development, maintenance, and prevention purposes, the methods of the present disclosure preferably include continuous, daily administration of the nutritional products as described herein. Such development, maintenance, and preventive methods may be directed at subjects such as pregnant and postnatal women, infants, children, and adults, particularly older adults, who are susceptible to developing age-related macular degeneration or other retinal diseases and disorders due to hereditary considerations, environmental considerations, and the like.

In embodiments in which the lipophilic nutrient is Vitamin D, nutritional products including Vitamin D can be administered to subjects to promote healthy bone development, reduce Vitamin D deficiency, increase bone strength, preserve or increase bone mineralization, and preserve or increase bone mineral density. Nutritional products including Vitamin D can also be administered to subjects suffering from or at risk for suffering from diseases and conditions associated with inadequate bone mineralization, such as rickets, osteomalacia, osteoporosis, osteopenia, and bone fractures. The subjects receiving the nutritional products with Vitamin D may include, but are not limited to, pregnant and post-natal women, infants, children, adolescents, adults, post-menopausal women, and older adults. In some embodiments, the methods of the present disclosure are directed to pregnant or post-natal women, to promote healthy bone development in the developing fetus or infant. In some embodiments, the methods of the present disclosure are directed to infants and children, to promote healthy bone development and prevent rickets or bone fractures in the growing child. In some embodiments, the methods of the present disclosure are directed to adolescents and adults, to promote increased bone mineralization and bone mineral density. In some embodiments, the methods of the present disclosure are directed to post-menopausal women, to prevent or slow the onset of osteoporosis. In some embodiments, the methods of the present disclosure are directed to adults who have osteomalacia, osteoporosis, osteopenia, or other bone diseases and disorders. In some embodiments, the methods of the present disclosure are directed to "at risk" individuals, including individuals unaffected by or not otherwise afflicted by osteomalacia, osteoporosis, osteopenia, loss of balance and falling, bone fractures, or other bone diseases or disorders, for the purpose of preventing, minimizing, or delaying the development of such diseases and conditions over time. For such development, maintenance, and prevention purposes, the methods of the present disclosure preferably include continuous, daily administration of the nutritional products as described herein. Such development, maintenance, and preventive methods are directed at subjects such as pregnant and postnatal women, infants, children, adolescents, adults, post-menopausal women, and older adults. Preventative methods are particularly directed to older adults who are susceptible to developing age-related osteoporosis, osteopenia, loss of balance or falling, broken bones, or other diseases and disorders associated with inadequate Vitamin D consumption or inadequate bone mineralization.

In embodiments in which the lipophilic nutrient is Vitamin E, nutritional products including Vitamin E can be administered to subjects to provide antioxidants, promote cardiovascular health, and prevent or reduce the risks of some types of cancer. The subjects receiving the nutritional products with Vitamin E may include, but are not limited to, pregnant and post-natal women, infants, children, and adults. In some embodiments, the methods of the present disclosure may be directed to pregnant or post-natal women to promote healthy development in the developing fetus or infant. In some embodiments, the methods of the present disclosure may be directed to infants and children to promote healthy development in the growing child. In some embodiments, the methods of the present disclosure may be directed to adults who have cardiovascular disease. In some embodiments, the methods of the present disclosure are also directed to "at risk" individuals, including individuals unaffected by or not otherwise afflicted with cancer, cardiovascular disease, or other diseases or disorders, for the purpose of preventing, minimizing, or delaying the development of such diseases and conditions over time. For such development, maintenance, and prevention purposes, the methods of the present disclosure preferably include continuous, daily administration of the nutritional products as described herein. Such development, maintenance, and preventive methods may be directed at subjects such as pregnant and postnatal women, infants, children, and adults, particularly older adults who are susceptible to developing cancer, cardiovascular disease, or other diseases and disorders due to hereditary considerations, environmental considerations, and the like.

In embodiments in which the lipophilic nutrient is DHA, nutritional products including DHA can be administered to subjects to promote healthy eye, brain, and central nervous system development, maintain overall brain health, prevent or reduce age-related decline in mental functioning, and reduce cardiovascular and other diseases and disorders. The subjects receiving the nutritional products with DHA may include, but are not limited to, pregnant and post-natal women, infants, children, and adults. In some embodiments, the methods of the present disclosure may be directed to pregnant or post-natal women to promote eye, brain, and central nervous system development in the developing fetus or infant. In some embodiments, the methods of the present disclosure may be directed to infants and children to promote eye, brain, and central nervous system development in the growing child. In some embodiments, the methods of the present disclosure may be directed to adults to maintain overall brain health, prevent or reduce age-related decline in mental functioning, and reduce cardiovascular and other diseases and disorders. In some embodiments, the methods of the present disclosure are also directed to "at risk" individuals, including individuals unaffected by or not otherwise afflicted with age-related declines in mental functioning or cardiovascular disease, for the purpose of preventing, minimizing, or delaying the development of such diseases and conditions over time. For such development, maintenance, and prevention purposes, the methods of the present disclosure preferably include continuous, daily administration of the nutritional products as described herein. Such development, maintenance, and preventive methods may be directed at subjects such as pregnant and postnatal women, infants, children, and adults, particularly older adults who are susceptible to age-related declines in mental functioning, cardiovascular disease, or other diseases and disorders due to hereditary considerations, environmental considerations, and the like.

In these embodiments, an individual desirably consumes at least one serving of the nutritional product daily, and in some embodiments, may consume two, three, or even more servings per day. Each serving is desirably administered as a single undivided dose, although the serving may also be divided into two or more partial or divided servings to be taken at two or more times during the day. The methods of the present disclosure include continuous day after day administration, as well as periodic or limited administration, although continuous day after day administration is generally desirable. The nutritional products may be used by infants, children, and adults.

EXAMPLES

The following examples illustrate specific embodiments and specific features of the nutritional products and fortifying powders comprising a lipophilic nutrient. The examples are given solely for the purpose of illustration and are not to be construed as a limitation of the present disclosure, as many variations thereof are possible without departing from the spirit and scope of the disclosure. All exemplified amounts are weight percentages based upon the total weight of the composition, unless otherwise specified.

Examples 1-3

In Examples 1-3, three dry mixable powders containing lutein were prepared. Examples 1 and 2 are comparative examples prepared according to the prior art, and Example 3 is an fortifying powder prepared according to the present disclosure. The resulting powders were analyzed for dispersion of the lutein, flowability, and reconstitution properties.

Two different oils were compared in the Examples: high oleic safflower oil (HOSafO, Example 1), and MDG oil (MDG, Examples 2-3). The three oils samples were heated to 125° F. (52° C.), and a 20% lutein suspension in safflower oil was added to each. Lecithin, a phospholipid, was added to the MDG oil and lutein mixture of Example 3. Next, a solution of non-fat dry milk was dissolved in water at temperature of 140° F. (60° C.). Each oil sample was added to individual portions of the milk solution. The final compositions of the example mixtures are shown in Table 3.

TABLE 3

| Component | Comparative Example 1 Wt % | Comparative Example 2 Wt % | Example 3 Wt % |
| --- | --- | --- | --- |
| Water | 74.981 | 74.981 | 74.981 |
| Non-fat Dry Milk | 18.746 | 18.746 | 18.746 |
| HOSafO | 6.249 | 0 | 0 |
| MDG Oil | 0 | 6.249 | 5.207 |
| Lecithin | 0 | 0 | 1.042 |
| Lutein (20%, in safflower oil) | 0.024 | 0.024 | 0.024 |

Each example mixture was then heated to a temperature between 160-185° F. (71-85° C.). The example mixtures were homogenized with a two-stage homogenizer, using a first stage pressure between 2,400-2,700 psi (16.5-18.6 MPa) and a second stage pressure between 300-500 psi (2.1-3.5 MPa). The example mixtures were further pasteurized at a temperature between 165-185° F. (74-85° C.), then cooled to a temperature below 45° F. (7° C.).

The example mixtures were spray dried as follows. The example mixtures were heated to between 150-165° F. (66-74° C.), then steam was injected into the mixtures to increase the temperature to between 240-260° F. (116-127° C.). The example mixtures were then passed through a five-second hold tube and flash cooled to between 170-190° F. (77-88° C.). The mixtures were then fed into an evaporator, where the total solids content of each mixture was increased to approximately 48% to 50%. Each mixture was spray dried at a temperature between 150-190° F. (66-88° C.) and a pressure of between 1,700 psi and 2,400 psi (11.7 MPa and 16.5 MPa). The resulting powders were collected and sealed in containers to await further testing.

The powders collected from Examples 1-3 were analyzed for powder flowability, loose bulk density, and reconstitution properties. The powders were also visually evaluated for dispersion of the lutein by optical microscopy.

Powder flowability is tested with a Brookfield Powder Flow Tester. The powder sample is placed into a sample trough and then the Powder Flow Tester performs a flow function (cohesive strength) test, which subjects the powder sample to shear testing to assess the powder flow. Powder flowability is evaluated on a 10-point "flow factor" scale, with 1-2 representing "very cohesive" (i.e., poor flowability), 2-4 representing "cohesive" (i.e., moderate flowability), and 4-10 representing "easy flowing" (i.e., good flowability). The results of the powder flowability test are shown in Table 4.

TABLE 4

| Sample | Flow Factor | Flow Properties |
| --- | --- | --- |
| Example 1 | 3.13 | Initially cohesive; became very cohesive at ~2.0 kPa or less |
| Example 2 | 2.44 | Initially cohesive; became very cohesive at ~1.5 kPa or less |
| Example 3 | 5.26 | Initially easy flowing; became cohesive at ~2.5 kPa or less | mechanical shaker with a cycle speed of 4 cycles per second, and the bottle is shaken for 20 cycles to reconstitute the powder. The reconstituted liquid from the bottle is poured down the side of a 250-ml graduated cylinder. The volume (mL) of foam generated from the reconstituted liquid is measured from the graduated cylinder at predetermined time intervals as the graduated cylinder sits.

The powder reconstituted phase separation test is performed as follows. An amount of powder is reconstituted in 180 mL of water, as described above for the powder reconstituted foam test. The reconstituted liquid is poured into a 250 ml graduated cylinder and allowed to sit for 30 minutes. The reconstituted liquid is then observed for evidence of separation. The top phase volume (mL) is measured from the graduated cylinder.

The powder reconstituted slide grain test is performed as follows. An amount of powder is reconstituted in 180 mL of water, as described above for the powder reconstituted foam test. The reconstituted liquid is allowed to sit for 5 minutes, and any surface foam is carefully removed with a spoon. The reconstituted liquid is gently stirred. Once the liquid becomes still, a 3" by 1" by 1 mm glass slide is immersed vertically into the center of the container up to a minimum of 4 cm in depth for 5 seconds. The slide is removed from the liquid and held upright in a horizontal position as the liquid from the backside of the slide is wiped clean with a towel or cloth. Excess liquid on the lower edge of the slide is drained by laying the slide edge onto a paper towel. The slide is then visually examined through a 1.5× magnifying lens against a black background with white fluorescent light above. A rating value from 1 to 6 is given by visually comparing the liquid on the slide side-by-side with photographic standards.

The powders from Examples 1-3 were tested for loose bulk density and powder reconstitution. The results of these tests are shown in Table 5. The powder reconstitution tests were performed using 258 g of powder per 1 L of water for each Example.

TABLE 5

| Sample | Loose Bulk Density (g/cc) | Reconstituted Foam (mL) (t = 0 min) | Reconstituted Foam (mL) (t = 2 min) | Reconstituted Phase Separation, Top Phase (mL) | Reconstituted Slide Grain |
| --- | --- | --- | --- | --- | --- |
| Example 1 | 0.38 | 22 | 20 | 10 | 6 |
| Example 2 | 0.49 | 20 | 8 | 0 | 5 |
| Example 3 | 0.47 | 22 | 12 | 0 | 4 |

Example 3, made by the process of the present disclosure, produced a powder with good flowability properties. The comparative Examples 1-2 had inferior flowability properties.

The loose bulk density of the powders is analyzed by filling a cylinder of known volume and weight with powder, then measuring the resulting weight of the filled cylinder to calculate the loose bulk density.

The powder reconstituted foam test is performed as follows. An amount of powder suitable to be added to 180 ml of water is weighed. An 8-ounce bottle is filled with 180 ml of water, the preweighed powder is added to the bottle, and a cap is placed onto the bottle. The bottle is placed in a The powders containing MDG oil (Examples 2-3) have a bulk density that is comparable to the bulk density of the base nutritional powder (i.e., about 0.35 g/cc to about 0.61 g/cc) with which these powders would be dry blended. Dry blending powders with similar bulk density typically improves the uniformity of the blend. In addition, the reconstitution properties show that foam generated during reconstitution disperses more quickly for the powders containing MDG oil (Examples 2-3) than was observed for the powder containing HOSafO (Example 1). The reconstituted powders containing MDG oil showed no oil phase separation, and the slide grain values were reduced.

Figure 2:
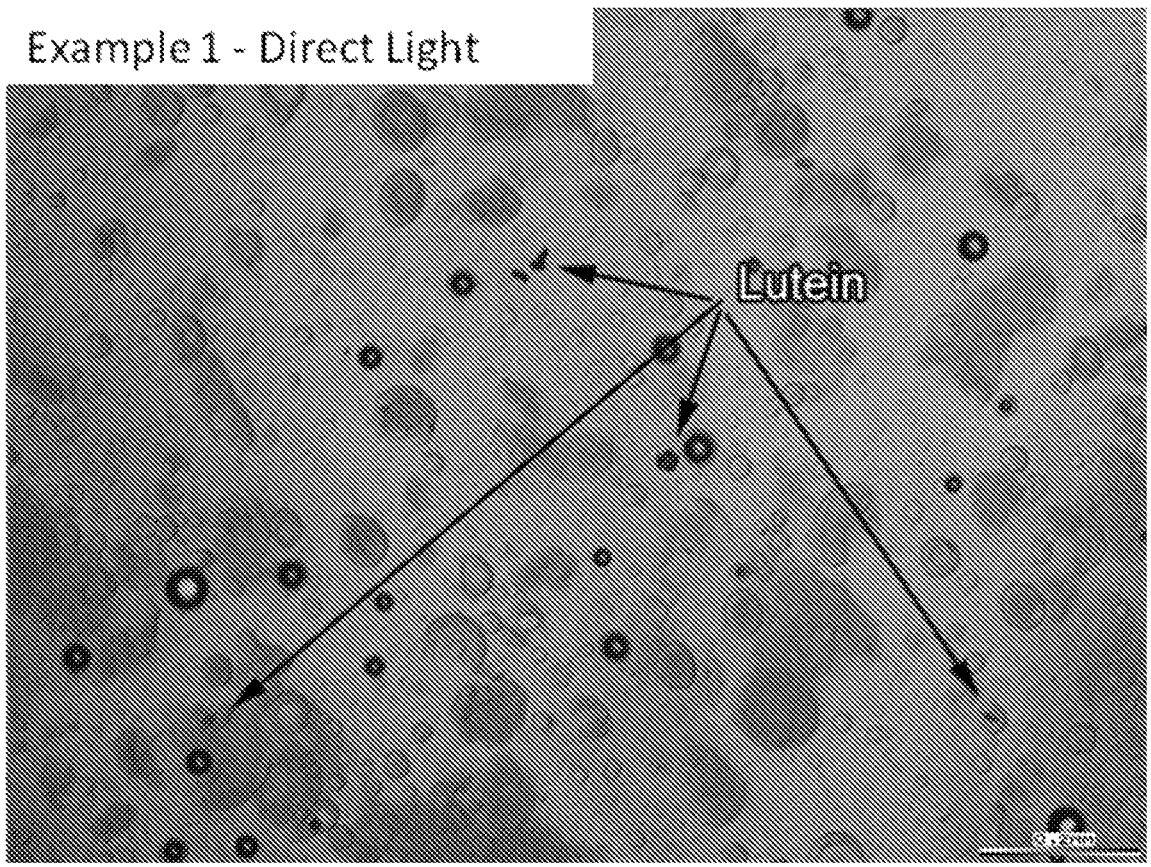
FIG. 2 is a photomicrograph of the reconstituted powder from Example 1, as seen under direct light.
Figure 3:
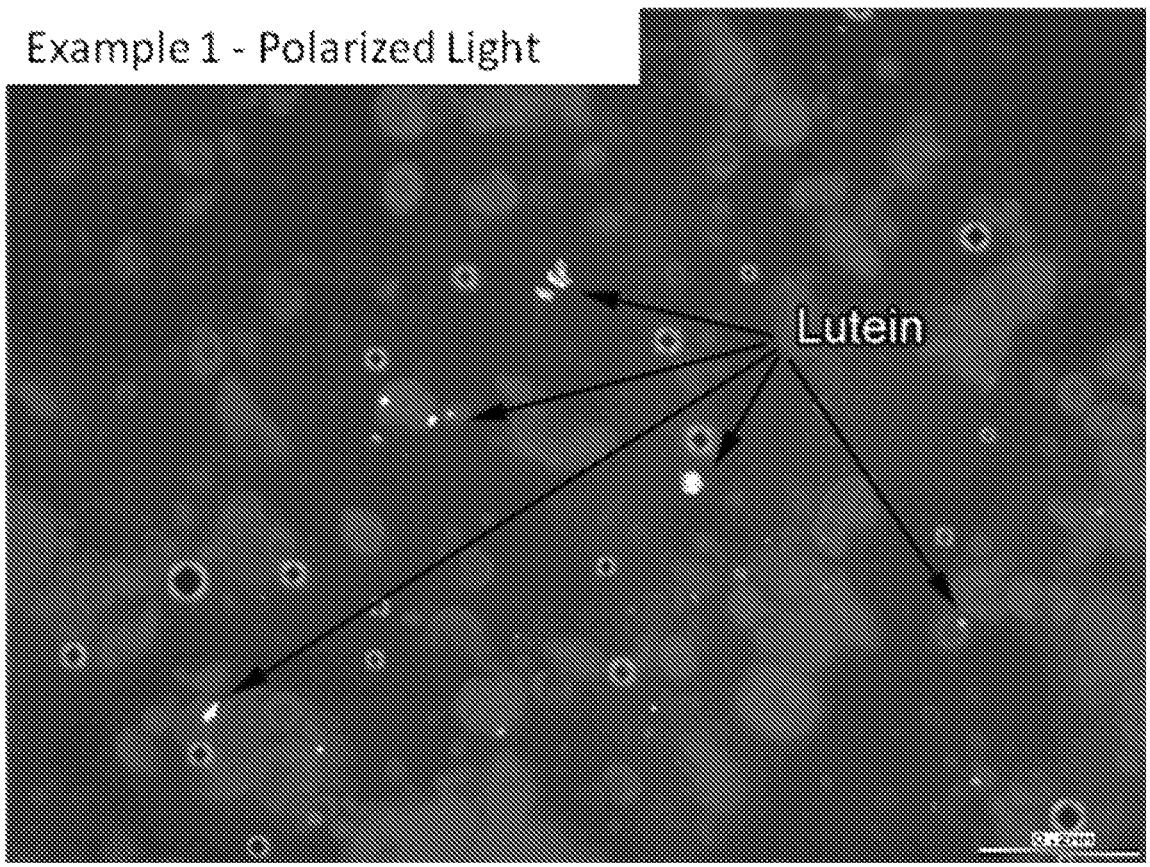
FIG. 3 is a photomicrograph of the reconstituted powder from Example 1, as seen under polarized light.
Figure 4:
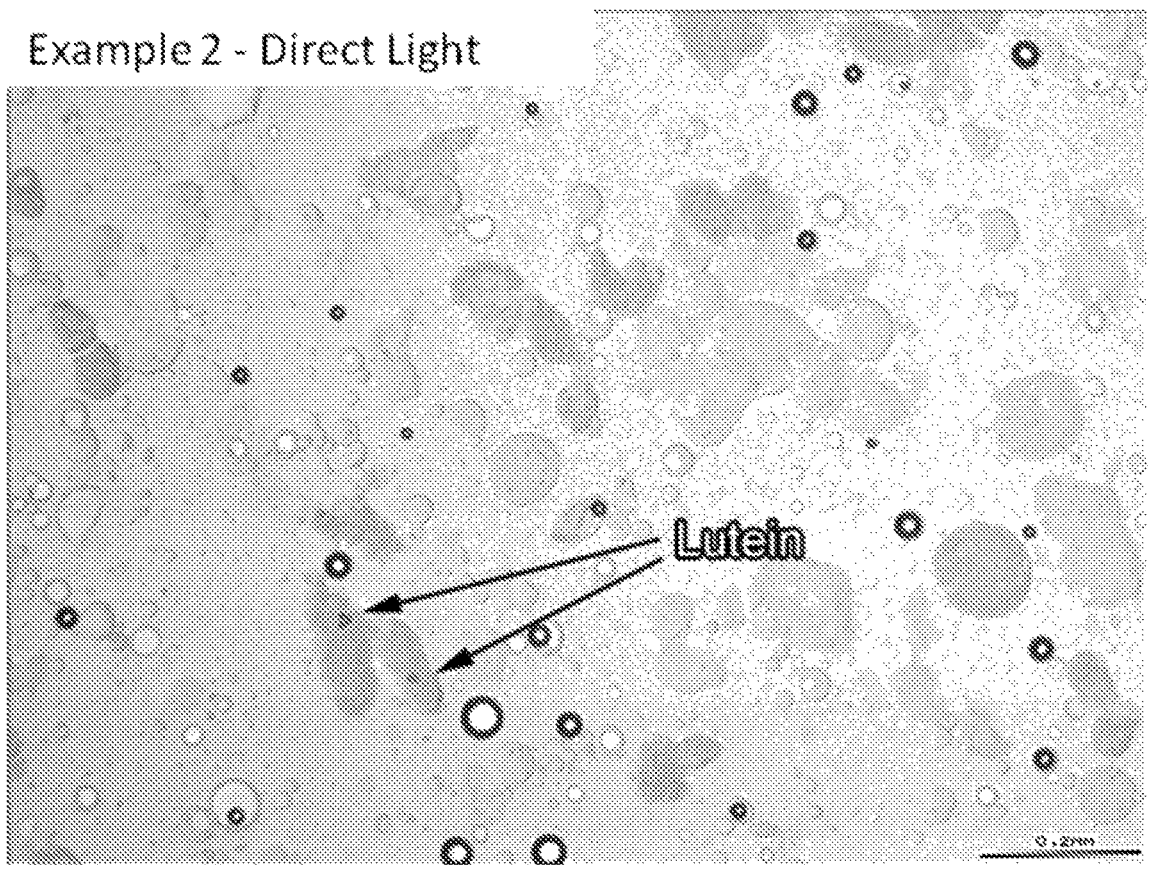
FIG. 4 is a photomicrograph of the reconstituted powder from Example 2, as seen under direct light.
Figure 5:
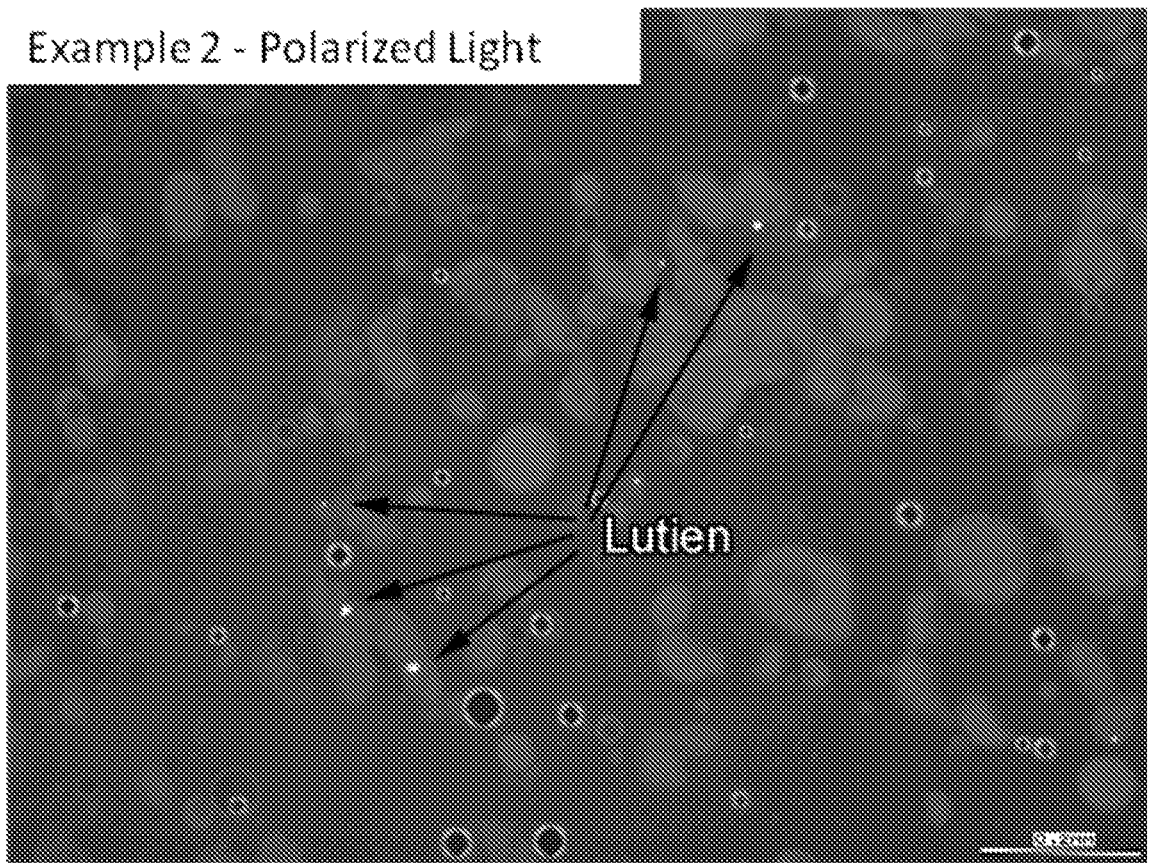
FIG. 5 is a photomicrograph of the reconstituted powder from Example 2, as seen under polarized light.
Figure 6:
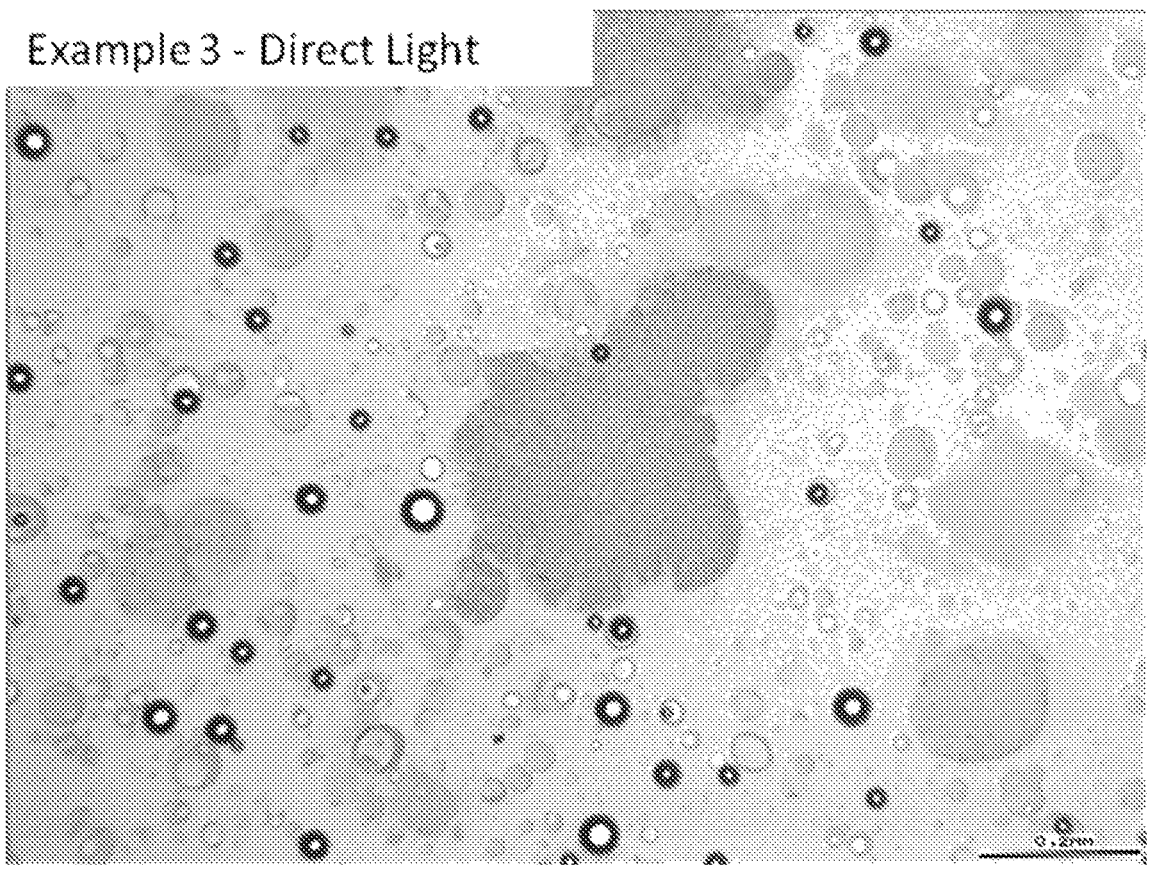
FIG. 6 is a photomicrograph of the reconstituted powder from Example 3, as seen under direct light.
Figure 7:
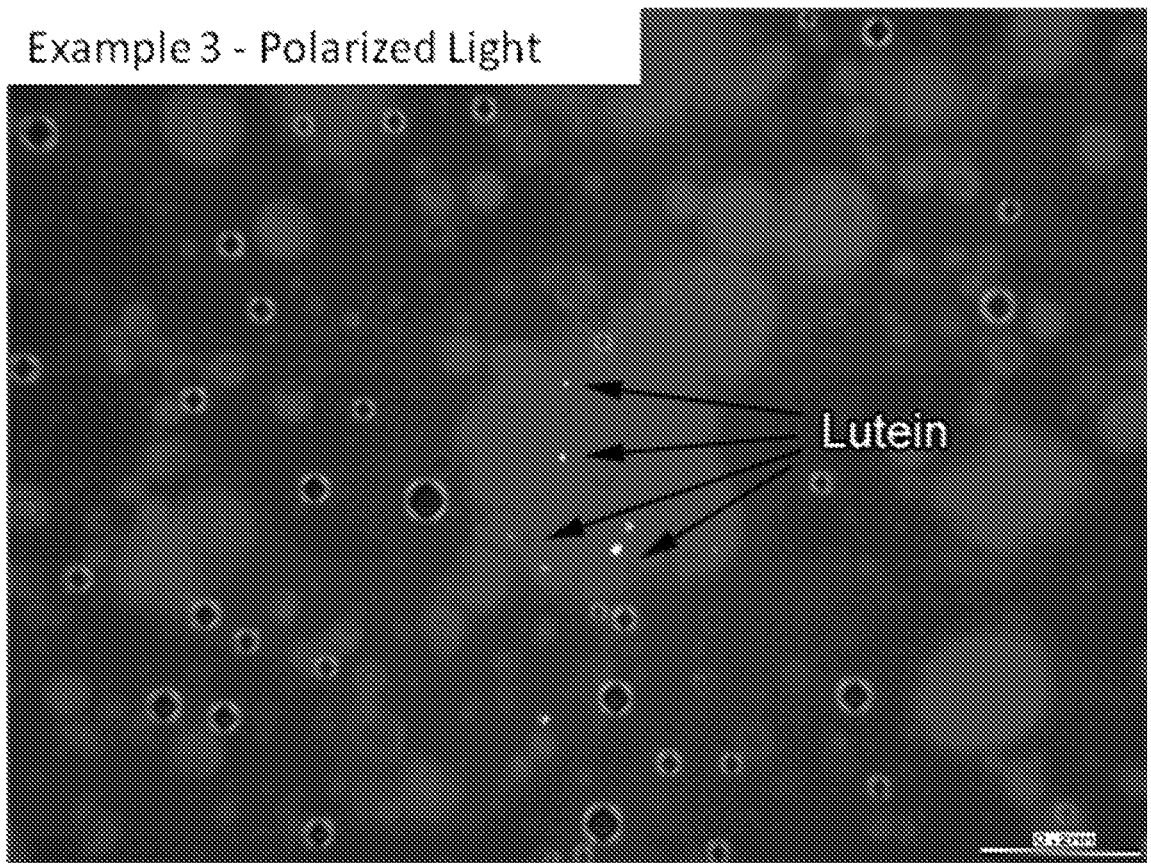
FIG. 7 is a photomicrograph of the reconstituted powder from Example 3, as seen under polarized light.

The dispersion of lutein in each powder sample was visually evaluated by light microscopy, using both direct and polarized light. Each powder sample was reconstituted in a 20 wt % emulsion with water. Samples of the reconstituted powder were examined under a light microscope at 100× magnification. Photomicrographs of the powders are shown in FIGS. 2 to 7. FIGS. 2 and 3 show photomicrographs of the reconstituted powder of Example 1, under direct and polarized light, respectively. It can be seen in both photomicrographs that many crystals of free, undispersed lutein are present. This is particularly apparent under polarized light. FIGS. 4 and 5 show photomicrographs of the reconstituted powder of Example 2, also under direct and polarized light, respectively. In these photomicrographs, there are fewer crystals of free lutein, and these crystals appear to be smaller than those of Example 1. It therefore appears that the lutein in the powder of Example 2 is more finely divided and possibly more dispersed than the lutein in the powder of Example 1. Finally, FIGS. 6-7 show photomicrographs of the reconstituted powder of Example 3, also under direct and polarized light, respectively. In these photomicrographs, the crystals of lutein are so small as to be essentially invisible under direct light, and can be observed and identified only with polarized light. It therefore appears that the lutein in the powder of Example 3 is the most finely divided than in Examples 1 or 2, and hence that the lutein may be more dispersed in the powder of Example 3.

Examples 4 and 5

In Examples 4 and 5, nutritional powders were prepared according to the present disclosure by dry blending a fortifying powder into a base nutritional powder at two concentrations. Example 3 was used as the fortifying powder.

As previously discussed, a base nutritional powder for a toddler or child nutritional formulation was prepared with the bill of ingredients shown in Table 6 below. All ingredient amounts are listed as per a 1,000 kg batch of nutritional powder.

TABLE 6

| Ingredient | Approximate amount per 1,000 kg |
| --- | --- |
| Corn Syrup Solids | 300.0 kg |
| Sucrose | 288.0 kg |
| Milk Protein Concentrate | 121.1 kg |
| Soy Oil | 82.0 kg |
| High Oleic Sunflower Oil | 69.5 kg |
| Whey Protein Concentrate | 27.9 kg |
| Medium Chain Triglycerides Oil | 26.7 kg |
| Isolated Soy Protein | 24.4 kg |
| Fructo-oligosaccharide | 22.9 kg |
| Potassium Citrate | 7.1 kg |
| Vanilla Flavor | 6.7 kg |
| Magnesium Phosphate Dibasic | 5.7 kg |
| Potassium Chloride | 4.3 kg |
| Sodium Chloride | 3.7 kg |
| Tricalcium Phosphate | 3.2 kg |
| Docosahexaenoic Acid | 2.0 kg |
| Choline Chloride | 1.7 kg |
| Potassium Phosphate Monobasic | 1.5 kg |
| Calcium Carbonate | 1.4 kg |
| Potassium Phosphate Dibasic | 1.2 kg |
| Ascorbic Acid | 871.7 g |
| Arachidonic Acid | 645.0 g |
| Ascorbyl Palmitate | 502.1 g |
| Taurine | 413.0 g |
| m-Inositol | 346.1 g |
| Ferrous Sulfate | 180.7 g |
| L-Carnitine Tartrate | 126.8 g |
| *Lactobacillus Acidophilus* | 100.0 g |
| Tocopherol-2 | 83.7 g |

TABLE 6-continued

| Ingredient | Approximate amount per 1,000 kg |
| --- | --- |
| Zinc Sulfate | 54.8 g |
| dl-Alpha Tocopheryl Acetate | 49.5 g |
| d-Calcium Pantothenate | 43.8 g |
| Niacinamide | 39.9 g |
| Bifidobacterium Lactis | 35.0 g |
| dl-Alpha Tocopheryl Acetate | 23.8 g |
| Manganese Sulfate | 19.4 g |
| Pyridoxine HCl | 17.7 g |
| Thiamine HCl | 15.7 g |
| Riboflavin | 12.6 g |
| Copper Sulfate | 7.0 g |
| Vitamin A Palmitate | 7.0 g |
| Folic Acid | 1.5 g |
| Vitamin A Palmitate | 1.2 g |
| Potassium Iodide | 561.7 mg |
| Chromium Chloride | 415.4 mg |
| Sodium Selenite | 272.2 mg |
| Phylloquinone | 211.8 mg |
| Sodium Molybdate | 184.4 mg |
| Biotin | 121.2 mg |
| Vitamin D3 | 102.4 mg |
| Potassium Iodide | 89.2 mg |
| Cyanocobalamin | 10.1 mg |

Example 4 was prepared by mixing 2 grams of the fortifying powder with 430 grams of base nutritional powder. Example 5 was prepared by mixing 34.88 grams of the fortifying powder with 397.12 grams of base nutritional powder. The powders were mixed for 2 minutes by tumbling the powders in a container.

The nutritional powders of Examples 4 and 5 were tested for loose bulk density, powder flowability, and reconstitution properties by the test methods described above. The powder reconstitution tests were performed using 216 g of powder per 1 L of water for each Example. The nutritional powders of Examples 4 and 5 were also analyzed for vibrated bulk density as follows. The vibrated bulk density of the powders was analyzed by filling a cylinder of known volume and weight with powder and clamping the cylinder onto a vibrating apparatus. The sample is vibrated and then removed. The excess powder is removed to make the sample flush with the top of the known volume cylinder. The resulting net weight of the powder in the cylinder is used to calculate the vibrated bulk density.

TABLE 7

| Sample | Loose Bulk Density (g/cc) | Vibrated Bulk Density (g/cc) | Flow Factor | Reconstituted Foam (mL) (t = 0 min) | Reconstituted Foam (mL) (t = 30 min) |
| --- | --- | --- | --- | --- | --- |
| Base Nutritional Powder | 0.51 | 0.67 | 6.25 | 10 | 8 |
| Example 4 | 0.51 | 0.68 | 7.14 | 16 | 9 |
| Example 5 | 0.54 | 0.70 | 6.67 | 6 | 4 |

The addition of the fortifying powder to the base nutritional powder improved the flowability and increased the bulk density allowing for smaller package size. In addition, Example 5 had significant reduction in foam over the base nutritional powder.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative compositions, formulations, and methods, and illustrative examples shown and described. Accordingly, departures may be made from such details without departing from the spirit or scope of the applicant's general disclosure herein.

What is claimed is:

1. A method of preparing a fortifying powder containing a lipophilic nutrient, the method comprising:
   a. mixing a lipophilic nutrient, a monoglyceride and diglyceride (MDG) oil, and a phospholipid in the presence of heat to form a first mixture;
   b. mixing an aqueous solution comprising a carrier with the first mixture to form a second mixture; and
   c. drying the second mixture to form the fortifying powder wherein:
      the MDG oil is present at a concentration of 6 wt % to about 50 wt % of the fortifying powder; and
      the phospholipid is present at a concentration of about 1 wt % to about 12 wt % of the fortifying powder.

2. The method of claim 1 wherein the lipophilic nutrient is selected from the group consisting of lutein, zeaxanthin, astaxanthin, beta-carotene, lycopene, Vitamin A, Vitamin D, Vitamin E, Vitamin K, Coenzyme Q10, linoleic acid, alpha linolenic acid, arachidonic acid, docosahexaenoic acid, eicosapentaenoic acid, and combinations thereof.

3. The method of claim 1 wherein the phospholipid is selected from the group consisting of lecithin, choline, phosphatidylcholine, phosphatidylethanolamine, phosphatidylinositol, phosphatidic acid, phosphatidyl serine, lysophosphatides, and combinations thereof.

4. The method of claim 1 wherein the lipophilic nutrient and MDG oil are mixed before adding the phospholipid.

5. The method of claim 1 wherein the phospholipid and MDG oil are mixed before adding the lipophilic nutrient.

6. The method of claim 1 wherein the step of drying the second mixture includes freeze drying, spray drying, tray dryers, tunnel dryers, roller dryers, drum dryers, fluidized bed dryers, pneumatic dryers, rotary dryers, trough dryers, bin dryers, belt dryers, vacuum dryers, or combinations thereof.

7. The method of claim 1, further comprising mixing the fortifying powder with a base nutritional composition to form a nutritional product, wherein the base nutritional composition comprises protein at a concentration of about 1 wt % to about 85 wt % and fat at a concentration of about 0.6 wt % to about 50 wt %.

8. The method of claim 7 wherein the base nutritional composition further comprises carbohydrate at a concentration of about 7 wt % to about 60 wt %.

9. The method of claim 7 wherein the fortifying powder is present at a concentration of about 0.1 wt % to about 16 wt % of the nutritional product.

10. The method of claim 1, wherein the first mixture is heated to a temperature of at least 85° F. during the mixing step.

11. The method of claim 1, wherein the first mixture is heated to a temperature of at least 120° F. during the mixing step.

12. The method of claim 1, wherein the aqueous solution comprises water and the carrier, and wherein the carrier comprises one or more proteins.

13. The method of claim 12 wherein the carrier further comprises one or more ingredients is selected from the group consisting of simple sugars, complex sugars, starches, cellulosics, sugar alcohols, proteins, and combinations thereof.

* * * * *